US008012013B2

(12) United States Patent
Walker et al.

(10) Patent No.: US 8,012,013 B2
(45) Date of Patent: Sep. 6, 2011

(54) METHOD AND APPARATUS FOR OFFERING A GUARANTEED WIN

(75) Inventors: Jay S. Walker, Ridgefield, CT (US); James A. Jorasch, Stamford, CT (US); Geoffrey M. Gelman, Stamford, CT (US); Scott T. Friesen, Stamford, CT (US); Stephen C. Tulley, Fairfield, CT (US); Norman C. Gilman, Stamford, CT (US); Daniel E. Tedesco, Huntington, CT (US); Michael D. Downs, Stamford, CT (US)

(73) Assignee: IGT, Reno, NV (US)

( * ) Notice: Subject to any disclaimer, the term of this patent is extended or adjusted under 35 U.S.C. 154(b) by 1634 days.

(21) Appl. No.: 10/205,305

(22) Filed: Jul. 24, 2002

(65) Prior Publication Data

US 2003/0060276 A1 Mar. 27, 2003

Related U.S. Application Data

(60) Provisional application No. 60/307,441, filed on Jul. 24, 2001.

(51) Int. Cl.

*A63F 9/24* (2006.01)
*A63F 13/00* (2006.01)
*G06F 17/00* (2006.01)
*G06F 19/00* (2006.01)

(52) U.S. Cl. .......................................... 463/21; 463/25

(58) Field of Classification Search .................... 463/25, 463/21

See application file for complete search history.

(56) References Cited

U.S. PATENT DOCUMENTS

| | | | | |
|---|---|---|---|---|
| 4,669,731 A | 6/1987 | Clarke | 273/143 R |
| 5,067,712 A | 11/1991 | Georgilas | 463/21 |
| 5,178,390 A | 1/1993 | Okada | 273/143 R |
| 5,288,081 A * | 2/1994 | Breeding | 273/292 |
| 5,294,120 A | 3/1994 | Schultz | 273/85 CP |
| 5,397,134 A | 3/1995 | Fishman et al. | 463/25 |
| 5,437,451 A * | 8/1995 | Fulton | 463/13 |
| 5,626,341 A | 5/1997 | Jones et al. | |
| 5,630,753 A * | 5/1997 | Fuchs | 463/9 |
| 6,024,642 A | 2/2000 | Stupak | 463/20 |
| 6,045,129 A | 4/2000 | Cooper et al. | 273/292 |
| 6,068,552 A | 5/2000 | Walker et al. | |
| 6,089,976 A * | 7/2000 | Schneider et al. | 463/16 |
| 6,110,041 A * | 8/2000 | Walker et al. | 463/20 |
| 6,231,445 B1 * | 5/2001 | Acres | 463/42 |

(Continued)

OTHER PUBLICATIONS

Bueschel, Richard, "Lemon, Cherries and BELL-FUIT-GUM", Nov. 1995, Royal Bell Books, Denver CO., First Edition, pp. 281-290.*

(Continued)

*Primary Examiner* — Melba Bumgarner
*Assistant Examiner* — Jason Pinheiro
(74) *Attorney, Agent, or Firm* — K&L Gates LLP

(57) ABSTRACT

A method in accordance with one embodiment of the present invention is provided, the method comprising the steps of generating a first outcome of a game of chance, determining a target outcome, receiving a first wager, generating a second outcome based on the first outcome, and repeating the step of generating the second outcome until the second outcome matches the target outcome, before receiving any second wager.

31 Claims, 13 Drawing Sheets

U.S. PATENT DOCUMENTS

| | | | | |
|---|---|---|---|---|
| 6,234,897 | B1 * | 5/2001 | Frohm et al. | 463/20 |
| 6,270,409 | B1 * | 8/2001 | Shuster | 463/20 |
| 6,293,866 | B1 * | 9/2001 | Walker et al. | 463/20 |
| 6,312,334 | B1 * | 11/2001 | Yoseloff | 463/25 |
| 6,343,989 | B1 | 2/2002 | Wood et al. | 463/23 |
| 7,192,346 | B2 * | 3/2007 | Mathis | 463/20 |
| 2003/0060256 | A1 * | 3/2003 | Joshi | 463/16 |

OTHER PUBLICATIONS

Fey, Marshall, Slot Machines A Pictorial History of the First 100 Years, 1997, Libery Bell Books, Reno, Nevada, Fifth Edition, pp. 76 & 77.*

"Hot Slots & Reel Deals", Atlantic City Insider, Oct. 1996, vol. 1, No. 2.

* cited by examiner

400

| PLAYER IDENTIFIER 402 | NAME 404 | FINANCIAL ACCOUNT IDENTIFIER 406 | HOME ADDRESS 408 | EMAIL ADDRESS 410 | DEMOGRAPHIC 412 | PREFERRED PRIMARY OUTCOME 414 | PREFERRED TARGET OUTCOME 416 | HISTORICAL THEORETICAL WIN 418 |
|---|---|---|---|---|---|---|---|---|
| P111123 | SAM BROWN | 1111-1111-1111-1111 | ANYPLACE, USA | SBROWN@RAIN.COM | MALE, AGE 23 | A(h), K(h), Q(h), J(h), 2(s) | A(h), K(h), Q(h), J(h), 10(h) | $2,345 |
| P222234 | LINDA JONES | 2222-2222-2222-2222 | SOMEPLACE, USA | LJONES@SHINE.COM | FEMALE, AGE 47 | BELL-BELL-7 | BELL-BELL-BELL | $765 |

FIG. 4

500

| | |
|---|---|
| PLAYER IDENTIFIER 502 | P11123 |
| PRIMARY OUTCOME 504 | A(h), K(h), Q(h), J(h), 6(c) |
| TARGET OUTCOME 506 | A(h), K(h), Q(h), J(h), 10(h) |
| CURRENT OUTCOME 508 | A(h), K(h), Q(h), J(h), 8(s) |
| NUMBER OF ITERATIONS 510 | 7 |
| MAXIMUM NUMBER OF ITERATIONS 512 | N/A |
| OFFER END TIME 514 | N/A |

PAYOUT TABLE

| ITERATION 518 | PROBABILITY OF ACHEIVING TARGET OUTCOME 520 | PAYOUT AMOUNT (COINS) 522 |
|---|---|---|
| 1 | 0.02128 | 400 |
| 2 | 0.02128 | 50 |
| 3 | 0.02128 | 40 |
| 4 | 0.02128 | 30 |
| 47 | 0.02128 | 6 |

| | |
|---|---|
| EXPECTED PAYOUT (COINS) 516 | 18.51 |

FIG. 5

1300

| PAYOUT (COINS) | ITERATION 1 | ITERATION 2 | ITERATION 3 |
|---|---|---|---|
| ORANGE-ORANGE-ORANGE | 10 | 8 | 6 |
| PLUM-PLUM-PLUM | 15 | 10 | 8 |
| BAR-BAR-BAR | 50 | 30 | 20 |

FIG. 13

METHOD AND APPARATUS FOR OFFERING A GUARANTEED WIN

This application claims the benefit of priority of U.S. Provisional Patent Application Ser. No. 60/307,441, filed Jul. 24, 2001, the contents of which are incorporated by reference herein for all purposes.

CROSS-REFERENCE TO RELATED APPLICATIONS

This application is related to the following co-pending applications:

(i) U.S. patent application Ser. No. 09/481,204, filed Jan. 11, 2000, and issued on Sep. 25, 2001 as U.S. Pat. No. 6,293,866 B1; which is a continuation of U.S. patent application Ser. No. 08/775,388, filed Dec. 30, 1996, and issued on Aug. 29, 2000 as U.S. Pat. No. 6,110,041; and also (ii) U.S. patent application Ser. No. 09/568,484, filed May 10, 2000; which is a continuation of U.S. patent application Ser. No. 09/052,295, filed Mar. 31, 1998, and issued on Jul. 11, 2000 as U.S. Pat. No. 6,086,477; and also (iii) U.S. patent application Ser. No. 09/879,299, filed Jun. 12, 2001; which is a continuation-in-part of U.S. patent application Ser. No. 09/437,204, filed Nov. 9, 1999, and issued on Jun. 12, 2001 as U.S. Pat. No. 6,244,957; which is a continuation of U.S. patent application Ser. No. 08/774,487, filed Dec. 30, 1996, and issued on Jan. 11, 2000 as U.S. Pat. No. 6,012,983;

the contents of each of which are incorporated by reference herein for all purposes.

FIELD OF THE INVENTION

The present invention relates to game playing apparatus and methods.

BACKGROUND OF THE INVENTION

Game playing may be based on skill and/or based on chance. In games of chance, a player places a wager on one or more games, and may receive a payout based on the outcome of the game and/or the wager. Games of chance may occur via various devices or may be conducted without a device. Examples of devices for games of chance include, without limitation, video poker machines, video blackjack machines, mechanical slot machines, and video slot machines.

BRIEF DESCRIPTION OF THE DRAWINGS

FIG. 4 is a tabular representation of one embodiment of a player database.

FIG. 5 is a tabular representation of one embodiment of an offer tracking database.

FIG. 13 is a tabular representation of a payout table according to one embodiment.

DETAILED DESCRIPTION OF THE INVENTION

Applicants have recognized that many different types of players would find it appealing to ensure they will enjoy one or more aspects of a winning experience. For example, many types of players would find it appealing to be guaranteed a win at a game of chance, to be guaranteed to achieve a winning outcome, to be guaranteed to achieve one or more game elements, or to be guaranteed a positive payout amount.

Some types of players would find it appealing to be ensured they will receive a particular outcome. For example, a player may find it appealing to have play of a game continue until a particular outcome is achieved. Some players may find it appealing to be able to receive a payout amount that corresponds to a number of iterations required to achieve a particular outcome. Many different types of players would find it appealing to be able to designate a particular outcome as an outcome that, if achieved, will end a game and/or will result in a positive payout amount being provided to the player.

Some types of players would find it appealing to be guaranteed the occurrence of one or more aspects of a winning experience in exchange for a payment. For example, some players would find it appealing to provide a payment and in return be permitted to have play of a game continue until he wins. Some players would also find it appealing to be able to break a "cold streak" at a game of chance by guaranteeing the occurrence of one or more aspects of a winning experience.

Applicants have also recognized that many different types of parties would benefit in various ways from participating in a payout to a player. Also, many different types of parties, including without limitation merchants and casinos, may benefit from the use by players of gaming devices that offer opportunities to players to enjoy aspects of a winning experience.

1. System

Figure 1:
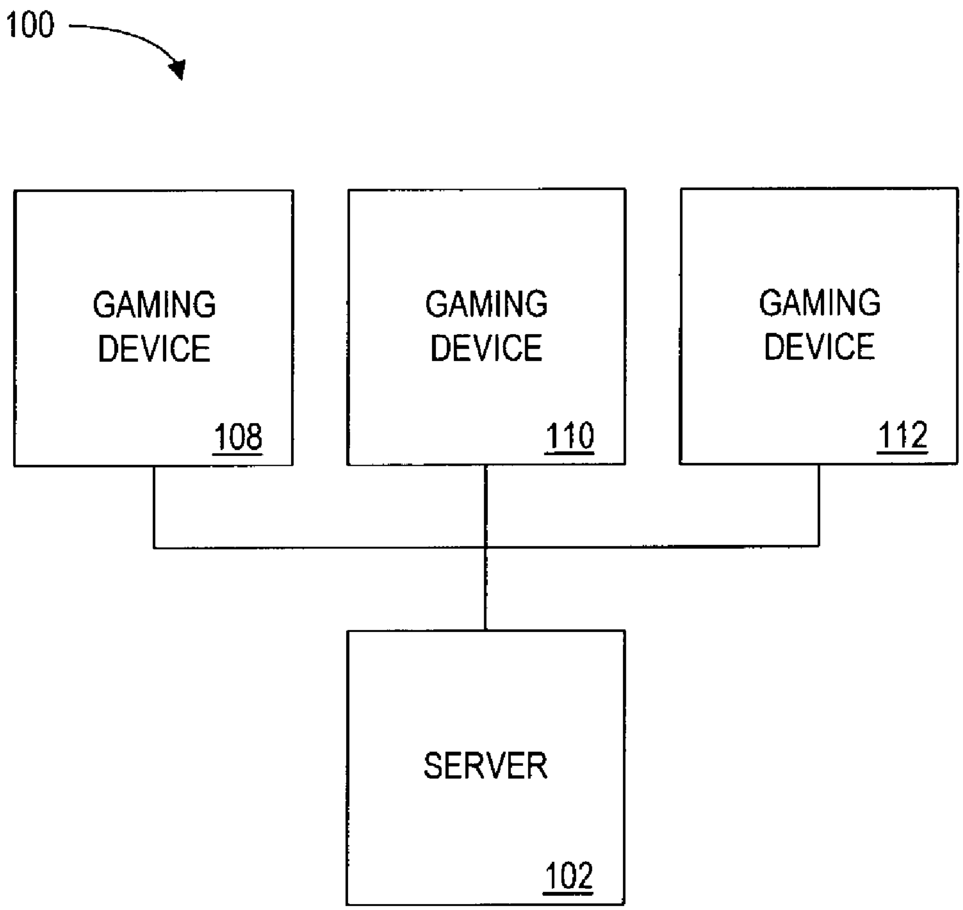
FIG. 1 is a block diagram of one embodiment of the present invention.

Referring now to FIG. 1, a system 100 according to one or more embodiments of the present invention includes server 102 that is in communication with gaming devices 108, 110 and 112. Each of the gaming devices may comprise one or more computing devices, such as those based on the Intel® Pentium® processor, adapted to communicate with the server 102, and/or may comprise a personal computer; a portable type of computer, such as a laptop computer, a palm-top computer, a wearable computer, or a hand-held computer; and/or a Personal Digital Assistant (PDA). Other equivalent devices capable of performing the methods specified herein are well known in the art.

Any number of gaming devices may be in communication with the server 102. The number of each depicted in FIG. 1 is solely for purposes of illustration.

The server 102 may communicate with the gaming devices directly or via a network, including, without limitation, the Internet, wireless network protocol, local area network or a combination thereof; through a Web site maintained by the server 102 on a remote server; or over an on-line data network including, without limitation, commercial on-line service providers and bulletin board systems. The server 102 may communicate with the gaming devices directly or indirectly. In some embodiments, the devices may communicate with the server 102 over RF, cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The server 102 may function as a "Web server" that generates Web pages (documents on the Web that typically include an HTML file and associated graphics and script files) that may be accessed via the Web and allows communication with the server 102 in a manner known in the art.

FIG. 1 depicts only an embodiment of the invention. Other arrangements of devices to perform various methods specified herein will be readily appreciated by those of skill in the art.

2. Devices

Figure 2:
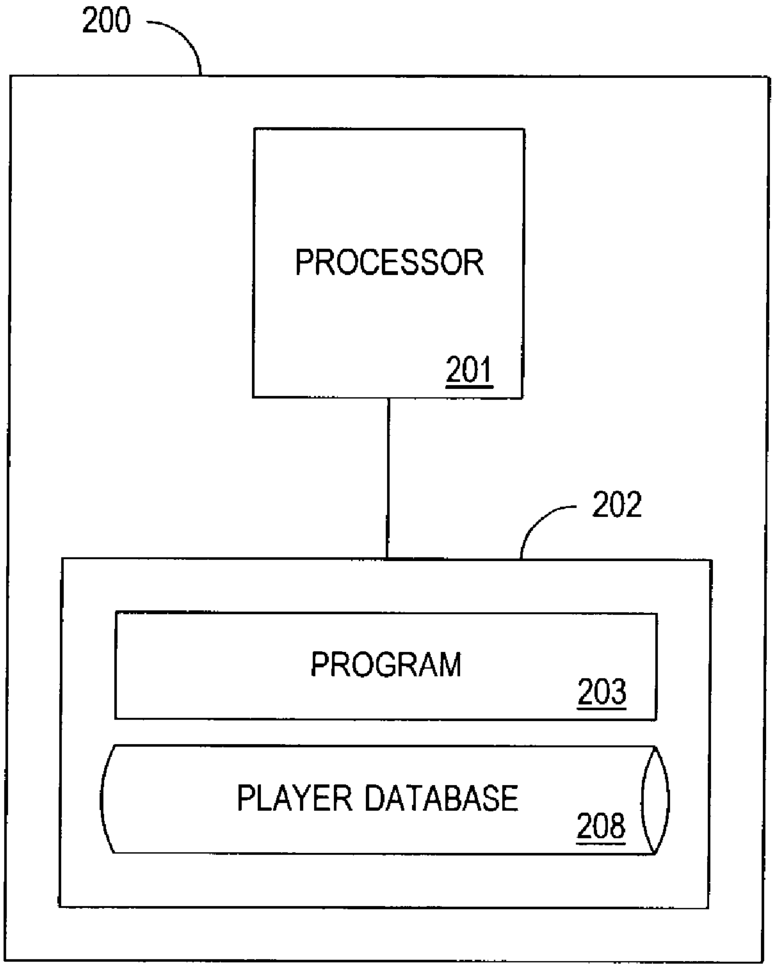
FIG. 2 is a block diagram of a server of one embodiment.

FIG. 2 illustrates an embodiment of the server 102. The server 200 may be implemented as a system controller, a dedicated hardware circuit, an appropriately programmed general-purpose computer, or any other appropriate device including, without limitation, electronic, mechanical or electro-mechanical devices.

The server 200 of the illustrated embodiment comprises a processor 201, such as one or more Intel® Pentium® microprocessors. The processor 201 is in communication with a data storage device 202. The data storage device 202 comprises magnetic memory, optical memory, semiconductor memory or any combination thereof. The data storage device 202 may include, for example, Random Access Memory (RAM), Read-Only Memory (ROM), a compact disc and/or a hard disk. The processor 201 and the storage device 202 may each be, for example: (i) located entirely within a single computer or computing device; or (ii) connected to each other by a remote communication medium including, without limitation, a serial port cable, a telephone line, a network connection or a radio frequency transceiver. In some embodiments, the server 102 may comprise one or more computers that are connected to a remote server computer for maintaining databases.

The data storage device 202 stores a program 203 for controlling the processor 201. The processor 201 performs instructions of the program 203, and thereby operates in accordance with the present invention, and particularly in accordance with the methods described in detail herein. The program 203 may be stored in a compressed, uncompiled and/or encrypted format, as well as in a variety of other forms known in the art. The program 203 furthermore includes program elements that may be necessary, including, without limitation, an operating system, a database management system and "device drivers" for allowing the processor 201 to interface with one or more peripheral devices. Appropriate program elements are well known to those skilled in the art, and need not be described in detail herein.

According to an embodiment of the present invention, the instructions of the program 203 may be read into a main memory from another computer-readable medium, such as into RAM from a hard drive or ROM. Execution of sequences of the instructions in program 203 causes processor 201 to perform process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware and software.

The storage device 202 also stores a player database 208, described in detail below.

Figure 3:
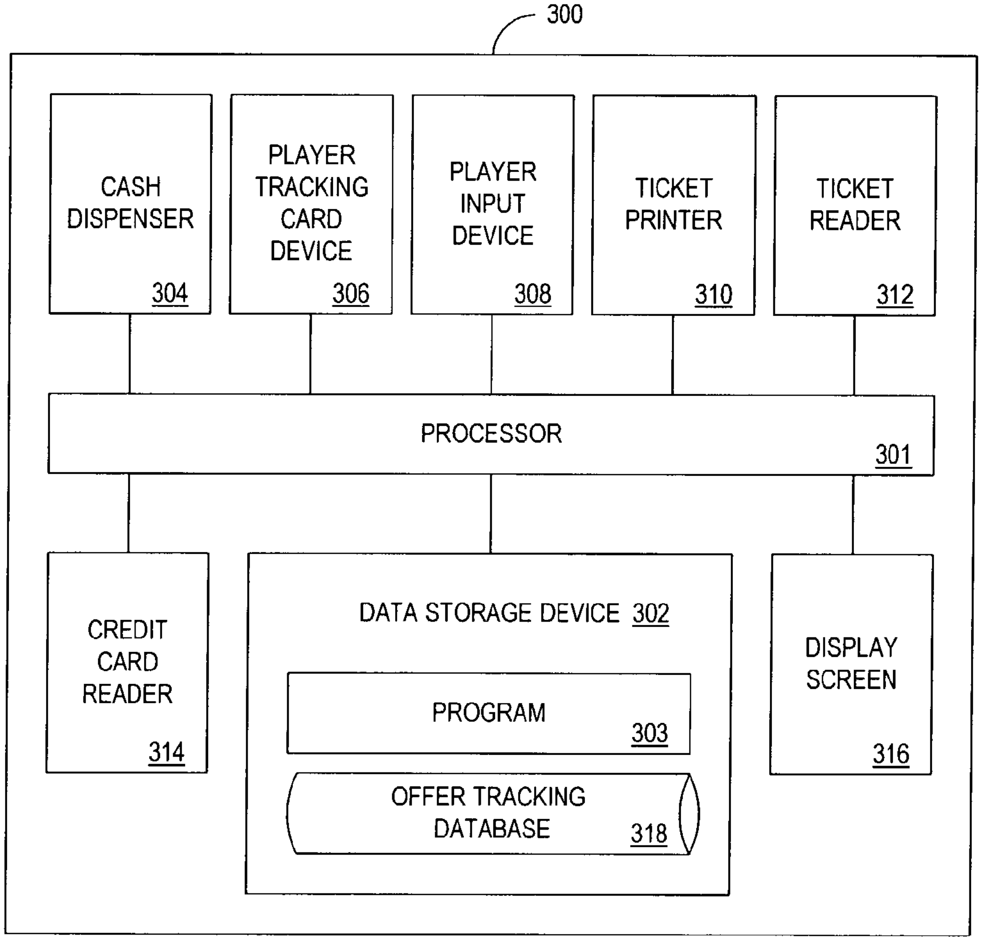
FIG. 3 is a block diagram of a gaming device of one embodiment.

FIG. 3 illustrates an embodiment of a gaming device. Well-known examples of gaming devices include, without limitation, slot machines. Well-known examples of slot machines include, without limitation, video poker machines, video blackjack machines, mechanical slot machines, video slot machines, video keno machines, video bingo machines, pachinko machines, and video lottery terminals. The gaming device may be implemented as a dedicated hardware circuit, an appropriately programmed general-purpose computer, or any other appropriate device including, without limitation, electronic, mechanical or electro-mechanical devices. Accordingly, the gaming device need not include the various exemplary components depicted in FIG. 3.

The gaming device 300 of the illustrated embodiment comprises a processor 301, such as one or more Intel® Pentium® microprocessors. The processor 301 is in communication with a data storage device 302. The data storage device 302 comprises magnetic memory, optical memory, semiconductor memory or any combination thereof. The data storage device 302 may include, for example, Random Access Memory (RAM), Read-Only Memory (ROM), a compact disc and/or a hard disk. The processor 301 and the storage device 302 may each be, for example: (i) located entirely within a single computer or computing device; or (ii) connected to each other by a remote communication medium, including, without limitation, a serial port cable, a telephone line, a network connection or a radio frequency transceiver. In some embodiments, the gaming device may comprise one or more computers that are connected to a remote server computer for maintaining databases.

The data storage device 302 stores a program 303 for controlling the processor 301. The processor 301 performs instructions of the program 303, and thereby operates in accordance with the present invention, and particularly in accordance with the methods described in detail herein. The program 303 may be stored in a compressed, uncompiled and/or encrypted format, as well as in a variety of other forms known in the art. The program 303 furthermore includes program elements that may be necessary, including, without limitation, an operating system, a database management system and "device drivers" for allowing the processor 301 to interface with one or more peripheral devices. Appropriate program elements are well known to those skilled in the art, and need not be described in detail herein.

According to an embodiment of the present invention, the instructions of the program 303 may be read into a main memory from another computer-readable medium, such as into RAM from a hard drive or ROM. Execution of sequences of the instructions in program 303 causes processor 301 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The storage device 302 also stores an offer tracking database 318, described in detail below.

The processor 301 may also be in communication with a cash dispenser 304, which dispenses coins and/or bills to players that have requested to have funds be dispensed. In another example, the cash dispenser 304 may dispense bills and/or tokens without a request by a player to have funds be dispensed (e.g., may dispense automatically in response to a signal from the processor 301).

The processor 301 may also be in communication with a player tracking card device 306, which preferably performs functions related to player tracking cards, such as reading player tracking cards and communicating information read from such cards to the processor 301. Typically, information read from such cards includes unique player identifiers, such as a sequence of digits or a sequence of alphanumeric characters.

The processor 301 may also be in communication with a player input device 308, which receives input from the player. Input device 308 may comprise a variety of devices, including, without limitation, one or more buttons, touch screens, handles, keypads, pointer devices (e.g., a mouse, a trackball), microphones or any combination of the above.

The processor 301 may also be in communication with a printer 310, which may be commanded to print onto a substrate, such as paper or other material. Printing may be via ink jet, laser printing or other methodology for registering indicia on a substrate. Alternatively, the substrate may be registered with indicia by deforming the substrate in a variety of ways known in the art, including, without limitation, punching holes in the substrate and raising and/or lowering portions of the substrate relative to other portions. The printer 310 may be used for printing, e.g., receipts, coupons, or tickets.

The processor 301 may also be in communication with a ticket reader 312, which is capable of reading, for example, receipts, coupons and/or tickets, and particularly indicia registered on any such substrates. The ticket reader 312 may use optical sensing of printed indicia, for example, and optical character recognition to read indicia from a ticket inserted in the ticket reader 312.

The processor 301 may also be in communication with a credit card reader 314. Such devices are known in the art, and generally allow a card such as a credit card or debit card to be inserted therewithin. The card may include a magnetic stripe or other form of data storage, which the credit card reader 314 is capable of sensing and interpreting. Typically, the credit card reader allows a credit card transaction to be processed by communication with a credit card clearinghouse in a manner known in the art.

The processor 301 may also be in communication with a display screen 316, which displays images in a manner known in the art. Typical display screens include, without limitation, liquid crystal displays, plasma displays and video display monitors.

3. Databases

Any databases noted above are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. For example, those skilled in the art will understand that the number and/or content of the databases can be different from those illustrated herein. The exemplary information of two or more described databases alternatively may be included in one database. Further, the exemplary information of one described database alternatively may be included in more than one database. Similarly, the illustrated entries of the databases represent exemplary information only; those skilled in the art will understand that the number and/or content of the entries can be different from those illustrated herein. Based on the present disclosure many other arrangements of data will be readily understood by those of skill in the art.

3.1. Player Database

FIG. 4 is a tabular representation 400 of the player database 208 of FIG. 2. The tabular representation 400 of the player database 208 includes a number of example records or entries, each indicating a player. Those skilled in the art will understand that the player database 208 may include any number of entries. The tabular representation 400 also defines fields for each of the entries or records. The fields specify: (i) a player identifier 402 that uniquely identifies the player, such as a player tracking card number; (ii) a player name 404; (iii) a financial account identifier 406 of the player, which may represent, for example, a credit card account, a debit card account and other financial accounts; (iv) a home address 408 of the player; (v) an email address 410 of the player; (vi) a demographic 412 of the player, which may indicate, for example, the gender, age, residence, income and/or occupation of the player; (vii) a preferred primary outcome 414 of the player, which provides an indication of one or more initial outcomes from which, or based on which, the player prefers to pursue one or more target outcomes; (viii) a preferred target outcome 416 of the player, which provides an indication of one or more outcomes that the player prefers to achieve; and (ix) a historical theoretical win 418 of the player, based on, for example, the number and types of games the player has played.

Not all of the fields depicted in FIG. 4 are required, and various substitutions, deletions and other changes to the tabular representation will be readily apparent to those of ordinary skill in the art. For example, the preferred primary outcome is not needed in many embodiments. The depicted fields, for example the demographic information, are for illustration only. Various other forms of demographic information are described herein and still others will be readily apparent to those of skill in the art.

3.2. Offer Tracking Database

FIG. 5 is a tabular representation 500 of the offer tracking database 318 of FIG. 3. The tabular representation 500 of the offer tracking database 318 includes an example record or entry indicating information about an exemplary offer. Those skilled in the art will understand that the offer tracking database 318 may include any number of entries. The tabular representation 500 also defines fields for the entries or records. The fields specify: (i) a player identifier 502 that uniquely identifies a player; (ii) a primary outcome 504 that includes a representation of a primary outcome associated with an offer, such as a primary hand or a primary set of game symbols; (iii) a target outcome 506 that includes a representation of a target outcome associated with the offer, such as a target hand or target set of symbols that the player desires to achieve; (iv) a current outcome 508 that includes a representation of a current outcome, such as a current hand or current set of game symbols; (v) a number of iterations 510 determined thus far in association with the offer; (vi) a maximum number of iterations 512 allowed the player, if applicable to the offer; and (vii) an offer end time 514 that corresponds a maximum amount of time allowed to achieve the target outcome, if applicable to the offer.

The tabular representation 500 of the offer tracking database 318 also defines a field specifying an expected payout

516 that the player would be provided by accepting an offer that guaranteed the target outcome. The tabular representation 500 of the offer tracking database 318 also defines a representation of a payout table associated with the offer being tracked. The representation of the payout table also defines fields, which specify: (i) an iteration 518 that indicates a particular iteration corresponding to an attempt to achieve the target outcome 506, such as the generation of a hand of cards or one or more game symbols; (ii) a probability of achieving the target outcome 520 on the particular iteration; and (iii) a payout amount 522 that indicates an amount to be provided to the player if the target outcome is achieved on the particular iteration.

Not all of the fields depicted in FIG. 5 are required, and various substitutions, deletions and other changes to the tabular representation will be readily apparent to those of ordinary skill in the art. For example, the maximum number of iterations 512 is not needed in many embodiments. As another example, neither the player identifier 502, the maximum amount of time allowed 514, nor the probability of achieving the target outcome 520 is needed in many embodiments. The depicted fields, for example the primary, target, and current outcomes, are for illustration only. Various other types and/or representations of outcomes are described herein and still others will be readily apparent to those of skill in the art.

The representation of the values for payout amounts 522 are depicted in FIG. 5 in terms of a number of coins. Payout amounts may alternatively be represented as a variable 'X'. In other words, the ratio of values for any two payout amounts may be a constant. Many other representations are possible. For example, the payout amount 522 may include for each respective iteration a dollar amount (or credit amount, etc.).

4. Processes

Figure 6:
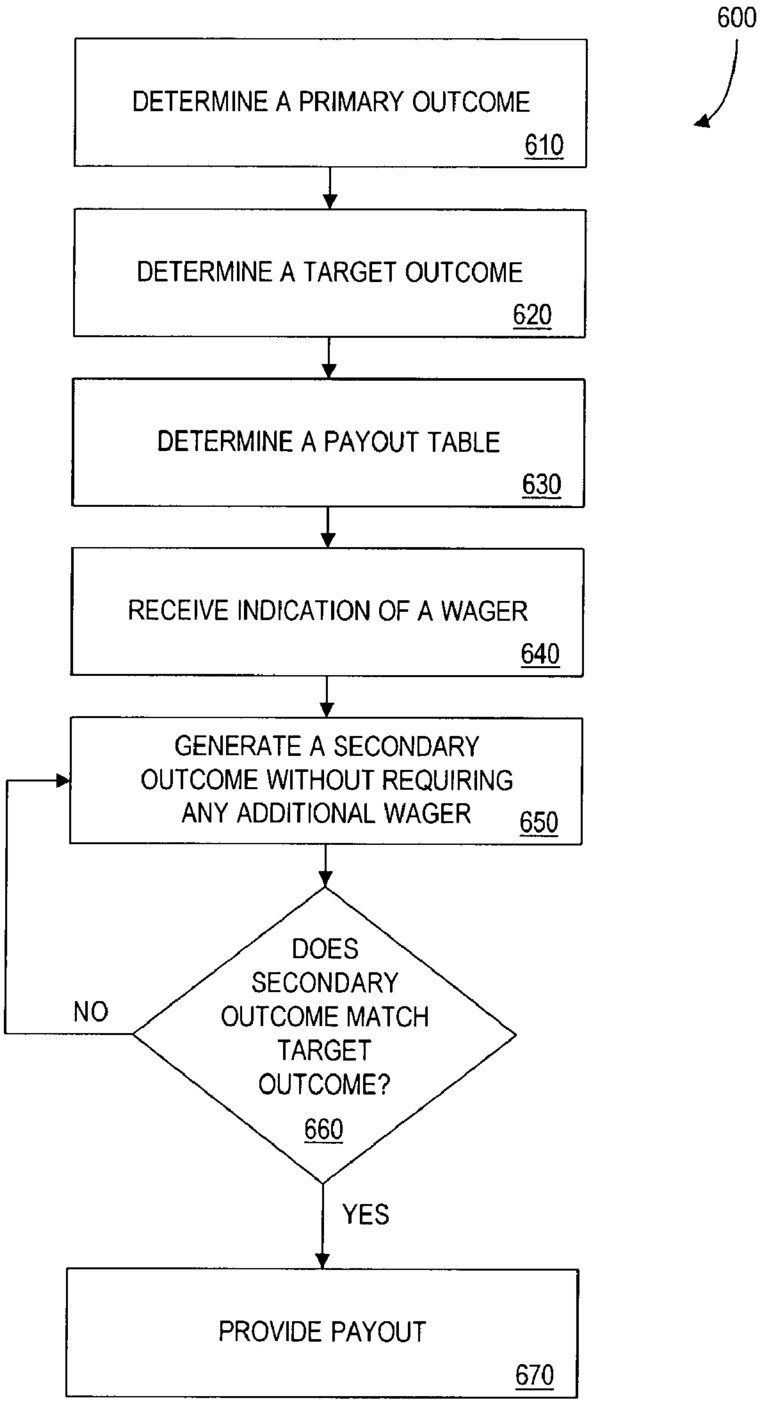
FIG. 6 is a flow chart representing one embodiment of a process that may be performed by a gaming device.

Referring to FIG. 6, a flow chart 600 represents an embodiment of the present invention that may be performed by a gaming device, including, without limitation, a slot machine or video poker machine. The particular arrangement of elements in the flow chart of FIG. 6, as well as the other flow charts discussed herein, is not meant to imply a fixed order to the steps; the steps can be practiced in any order that is practicable for various embodiments of the present invention.

A gaming device determines a primary outcome (step 610) and determines a target outcome (step 620). The target outcome is usually but not always determined by receiving an indication of a designation of the target outcome by a player. The target outcome is typically, but not always, based on the primary outcome. The gaming device also determines a payout table (step 630). The payout table is preferably, but not necessarily, based on the target outcome. The gaming device also receives an indication of a wager by a player (step 640). The gaming device generates a secondary outcome without requiring any additional wager (step 650) and then determines whether the secondary outcome matches the target outcome (step 660). In some embodiments, the secondary outcome is generated based on the primary outcome. For example, the secondary outcome may include at least one game symbol or element included in the primary outcome. If the secondary outcome matches the target outcome, a payout is provided to the player (step 670) in a manner known in the art, for example, by adjusting a credit balance. If the secondary outcome does not match the target outcome, another secondary outcome is generated without requiring any additional wager (step 650) and the process continues.

In some embodiments of the present invention, outcomes, including primary outcomes, target outcomes, and/or secondary outcomes may be generated based on a random or pseudo-random process (e.g., based on a random number generator of the gaming device). In some embodiments, outcomes may be determined in accordance with one or more payout tables, in a manner well known in the art. In some embodiments, outcomes may be based at least partly on the skill of the player.

In one or more embodiments of the present invention, outcomes may be based at least in part by a selection by a player. For example, the player may indicate a preference for a target outcome or primary outcome. Some embodiments provide for determining an outcome in response to a signal from a player. Players, for example, may request the generation of an outcome, or alternatively may indicate a preference for an outcome, by using a player input device of gaming device. For example, the gaming device may receive a signal via a button, a handle, or a touch screen.

Some embodiments provide for determining an outcome after or in response to receiving an indication of a wager by a player. In some alternative embodiments, a primary or target outcome is determined (e.g., generated by a gaming device) before receiving a wager from a player. In some embodiments, outcomes may be determined by the gaming device or by a server automatically.

In some embodiments of the present invention, outcomes (e.g., generated outcomes, indications of preferred outcomes) may be received by a gaming device from a player and/or a server. For example, a gaming device may display a representation of one or more outcomes to a player (e.g., via a menu), and receive an indication of at least one outcome selected by the player.

In some embodiments, outcomes or indications of outcomes may be received by a gaming device via a signal, a computer-readable medium, and/or a computer-readable memory. For example, a player may use a wireless PDA to beam a selection of a target outcome to an appropriately configured gaming device. In another example, an indication of an outcome may be stored on a memory of a player tracking card or other portable memory. In some embodiments, indications of outcomes may be received via a receipt or ticket. For example, a player may have started a session at a first gaming device and established a primary outcome and a target outcome, and received one or more secondary outcomes. An indication of such outcomes may be output to a player tracking card, or, alternatively, indicated on printed substrate, such as a gaming receipt. Then, the player may continue a guaranteed outcome session at a second gaming device by having the second gaming device read the gaming receipt or the player tracking card.

In some embodiments, outcomes of games of chance may comprise, without limitation, a slot reel, a slot reel symbol, a card, and/or a hand of cards. Other types of game elements or symbols and configurations of such elements are well known in the art. In some embodiments, the primary outcome is a losing outcome according to a standard payout table associated with the game of chance. In some embodiments, the primary outcome and/or target outcome are predetermined; the player is not given a choice.

In some embodiments, the target outcome is determined based on the primary outcome. For example, the target outcome has a higher associated rank than the primary outcome. In another example, the target outcome includes at least one game element or symbol that is included in the primary outcome.

A primary outcome may be any random or non-random set of information, including, without limitation, a configuration of symbols along the pay line of a slot machine, a set of cards that appear face-up on a video poker machine, a set of numbers appearing on a video keno machine, and so on. Some exemplary primary outcomes are:

Lemon-lemon-bar (e.g., appearing on a three reel slot machine)

A(h), A(s), A(d), J(h), 4(h) (e.g., appearing on a video poker machine)

Dealer: K(s), unknown; Player: 10(d), 2(h) (e.g., appearing on a video blackjack machine)

In some embodiments, a primary outcome is generated automatically, without initiation by the player. In one embodiment, the primary outcome is always the same outcome; the player does not get to designate a desired primary outcome or have a primary outcome generated. For example, the primary outcome in a video poker game might always be: K(s), Q(s), J(s), 10(s), 2(d). This primary outcome would, advantageously, always allow a player to draw to a royal flush, the most exciting outcome in video poker.

In other embodiments, the player chooses the primary outcome. The player may, for example, choose to have two reels of a three-reel slot machine read: bar-bar. The player then gets to spin the third reel in order to achieve a bar-bar-bar outcome.

In some embodiments, the target outcome will typically be an improvement over the primary outcome. For example, if the primary outcome is a poker hand, then the target outcome will typically be a poker hand of higher rank. In another example, if the primary outcome is a losing symbol configuration at a slot machine, then the target outcome will typically be a winning one. In yet another example, if the primary outcome at a slot machine is a winning symbol configuration, then the target outcome may be an outcome with an even higher value.

A target outcome will typically, but not always, bear some resemblance to the primary outcome. For example, if a primary outcome in video draw poker is: A(d), A(h), 6(c), 6(s), 2(d), then the target outcome may be either a hand with three aces and two sixes, or two aces and three sixes, i.e., a full house. Although a target outcome might be a straight (e.g., A(d), K(h), Q(s), J(s), 10(h)), a straight would bear little resemblance to the primary outcome and would therefore be reasonably improbable given the primary outcome. Of course, the target outcome could be the described straight, or any desired outcome in accordance with some embodiments. Similarly, in a three-reel slot game, a target outcome of bar-bar-bar would be typical given a primary outcome of bar-bar-orange.

The following are exemplary pairs of primary (shown first) and target outcomes (shown second):

cherry-cherry-orange→cherry-cherry-cherry (on a three-reel slot machine)

teapot-teapot-mug-donut-saucer→teapot-teapot-teapot-any-any (on a five-reel slot machine)

A(h), J(h), 9(h), 6(h), 2(s)→A(h), J(h), 9(h), 6(h), any(h) (on a video poker machine)

A→A, J (in video blackjack)

In many embodiments, the gaming device anticipates the target outcome based on the primary outcome. For example, if the primary outcome differs by only one card or one symbol from a winning outcome (e.g., in a standard payout table), then the gaming device may anticipate that the winning outcome will be the target outcome. The gaming device may then have the anticipated target outcome as a default target outcome, subject to change if the player so desires.

For example, if the primary outcome is "bell-bell-lemon," then the gaming device may execute a program to compare the primary outcome to all winning outcomes stored in a winning outcome database (not shown). The gaming device may determine that the "bell-bell-lemon" outcome differs from the winning outcome of "bell-bell-bell," in only the third symbol. Therefore, the gaming device may display "bell-bell-bell" as the target outcome. If the player then wishes, he may still select a differing target outcome using menus or using some other method. However, in some embodiments, the player has no choice as to the target outcome. Rather, the target outcome is set automatically by the gaming device.

In some embodiments, there are multiple target outcomes. For example, a player holding a hand of J(s), 10(s), 9(s), 8(s), 5(h), in video draw poker, may have target outcomes of any straight, or any flush. Thus, if the player discards the 5(h) and draws any 7 or any Q, he achieves a target outcome of a straight. If the player draws any spade, then he achieves a target outcome of a flush. If the player draws a seven of spades or a queen of spades, then he achieves a straight flush, which may have a higher payout than either a simple straight or a simple flush.

Once again, the gaming device may automatically set the multiple target outcomes. In one embodiment, target outcomes are set automatically to be any outcomes of higher rank or higher value than the primary outcome. In video poker, target outcomes might be any hands with higher poker rankings than that of the primary hand. In a slot machine embodiment, target outcomes may be any outcomes with typical payouts higher than that of the primary outcome.

In some embodiments, target outcomes are any outcomes of higher rank or value that can be achieved by changing only a particular subset of the cards or symbols associated with the primary outcome. For example, to generate a secondary outcome, a player may only be able to spin one reel of a three-reel slot machine. Then, if a primary outcome was "bar-bar-seven", the player would be able to achieve a target outcome of "bar-bar-bar", but not of "seven-seven-seven", since the latter would require the spin of more than one reel from the primary outcome.

Figure 11:
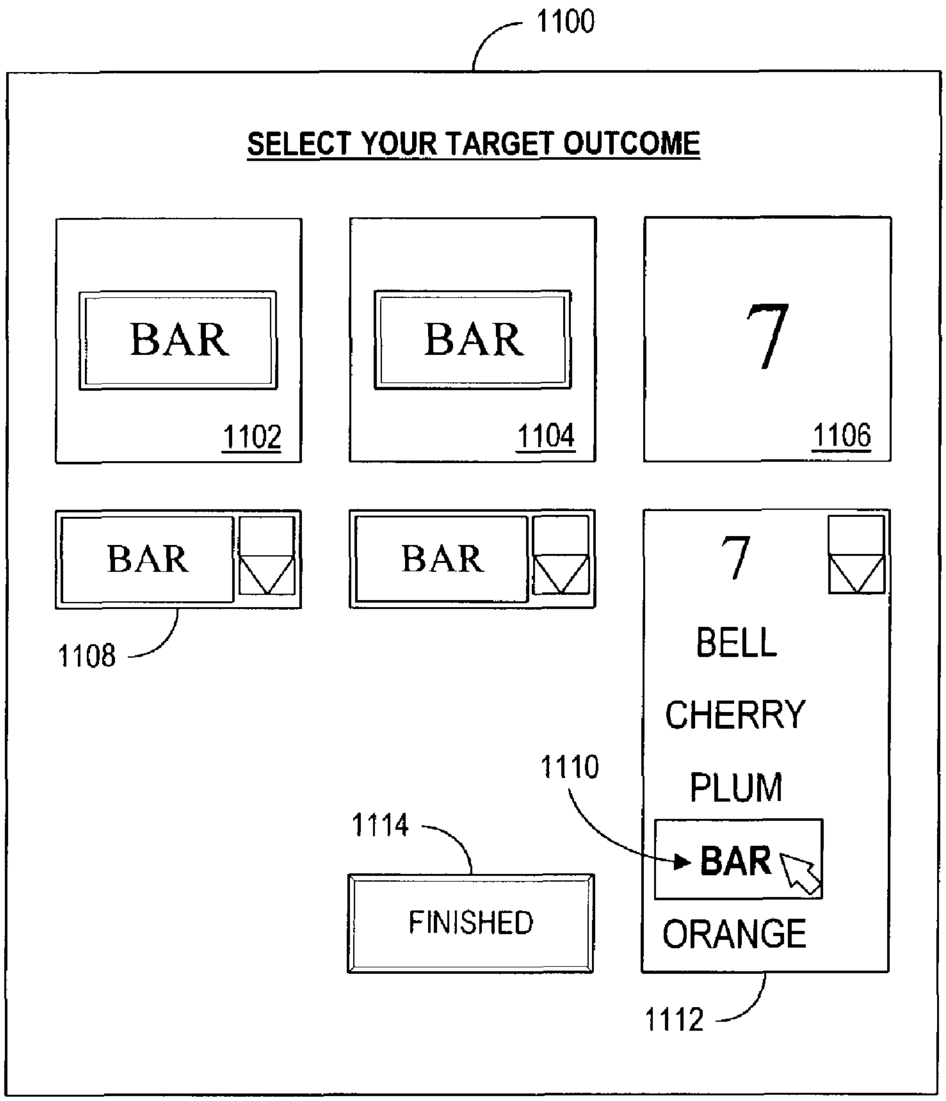
FIG. 11 is a display according to one embodiment.

In a reel slot machine embodiment, the player begins by selecting the symbol for the first reel in the target outcome. He highlights the "bar" in a menu containing a 7, bell, cherry, plum, bar, and orange. He repeats the process for the second and third reels. FIG. 11 shows an exemplary display 1100 from which a player selects target outcomes. In FIG. 11, the player has already selected the first two symbols 1102, 1104 of a target outcome, both of these being "bar". The player is in the process of choosing the third symbol 1106 of the target outcome by selecting the third symbol from a menu of possible symbols.

In a related embodiment, a player does not select a target outcome symbol by symbol or card by card. Rather, the player selects a complete outcome from a list of outcomes. For example, the player selects "bar-bar-bar" from a menu of outcomes rather than selecting "bar" from a menu for the first reel, "bar" from the menu of the second reel, and then "bar" from the menu for the third reel. In either embodiment, the player may touch areas on the screen of the device in order to indicate menu choices. For example, the player touches the area on a screen where an "orange" symbol is displayed so as to select "orange" as a target outcome for the first reel of the slot machine. The player might also press plastic buttons on the gaming device, each button corresponding to a symbol, card, or outcome to be selected. In another embodiment, the player scrolls through menus using arrow buttons. An "enter" button may be used to confirm a highlighted choice. Many other input mechanisms are possible, including those that use keyboards, computer mice, or voice inputs.

Once the player or the gaming device has determined a target outcome, the target outcome may be stored, for example, in the offer tracking database 318.

According to various embodiments, the gaming device may determine a payout table based on the primary and target outcomes. In many embodiments, the payout table describes how much money the player receives as a function of the number of secondary outcomes that must be generated before a secondary outcome matches the target outcome.

In one example, a video poker player holds: 10, 10, 3, 3, 6. The target outcome is any full house, i.e.: 10, 10, 3, 3, 10 or 10, 10, 3, 3, 3. The player is to keep drawing and discarding the fifth card until he draws another 10 or a 3. The payout table indicates that, for a wager of 5 coins the player will win 15 coins if he achieves a full house the first time he draws, 10 coins if he achieves a full house the second time he draws, 8 coins if he achieves the full house the third time he draws, and so on.

A payout table may individually list a particular payout for each possible number of iterations. In the previous example, with a standard fifty-two card deck, the player is guaranteed to draw either a 10 or a 3 within 44 tries, so long as discarded cards are not reinserted into the deck. Thus, a corresponding payout table may have a total of 44 entries. The first line gives the payout for achieving the full house on the first draw, the second line gives the payout for achieving the full house on the second draw, and so on. In another embodiment, the payout table describes a single payout in association with achieving the target outcome(s) in a range of tries. For example, the payout table has a single line that gives the payout for achieving the target outcome in thirteen or more tries. Other configurations of information about payouts and iterations will be understood by those of skill in the art.

In one embodiment, the payout table is structured to provide the player with an expected payout that is less than the amount of the player's wager. For example, the payout table may be structured such that the player receives, on average, 95 cents for every dollar wagered on the target outcome. In some embodiments, however, the payout table may provide the player with an expected payout that is greater than the amount of his wager. This may occur, for example, if the primary outcome is itself a special outcome. For example, a primary outcome of a straight in video poker is typically a winning outcome. The player may therefore be given a payout table with a positive expected return if the player draws to the straight flush. A player might also be granted a payout table with a positive expected payout if, for example, the player agrees to do business with a particular merchant. For example, the player might agree to switch his long distance service provider. The long distance service provider might then sponsor a payout table with a positive expected return. In embodiments where the payout table provides the player with an expected payout greater than the amount of his wager, the player may be limited in the amount of his wager.

In another embodiment, the player is involved in a standard game of video poker before deciding to switch to a version of the game described by one or more embodiments herein. For example, the player has been dealt a first five card hand. The player now has one opportunity to discard and draw additional cards before the game is decided. However, after being dealt the initial five-card hand, the player may switch to the game where he continues to draw new cards until he achieves one of a set of target outcomes. In this case, the payout table may be structured so that the expected winnings for the player in the new version of the game are related to what the player's expected winnings would be in the old version of the game. For example, the expected winnings from both versions of the game might be identical.

To illustrate an example, a 6/9 Jacks or Better™ video draw poker player holds: A(d), K(d), Q(d), J(d), 4(h). With proper play, the player will discard the 4(h) and draw a new card. The new card can give the player a number of favorable outcomes. Any ace, king, queen, or jack (a total of 12 possibilities in a diminishing deck) will give the player a pair. The payout for a pair, jacks or better, is 1 token. A 10(s), 10(h), or 10(c), a total of three possibilities, will give the player a simple straight, with a payout of 4 tokens. A 9 through 2 of diamonds (8 possibilities), will give the player a simple flush, with a payout of 6 tokens. Finally, a 10(d), or one possibility, will give the player a royal straight flush, with a payout of 800 tokens. Thus, the expected payout to a player with the above hand is:

$$EV\ \text{pair} + EV\ \text{straight} + EV\ \text{flush} + EV\ \text{royal straight flush} = 12/47 \times 1\ \text{token} + 3/47 \times 4\ \text{tokens} + 8/47 \times 6\ \text{tokens} + 1/47 \times 800\ \text{tokens} = 18.55\ \text{tokens}$$

Therefore, if the player decides to play the version of the game where he keeps drawing until he gets the royal straight flush, he may be given a payout table with an expected payout of 18.55 tokens, or nearly so. For example, the player may receive 400 tokens for achieving the royal straight flush on the first draw, 50 tokens on the second, then 40, 30, 25, 22, 20, 18, 15, 12, 10, 10, 10, 10, 10, and 6 tokens thereafter. The expected winnings for the player can be derived by multiplying the winnings paid for achieving the target outcome on a given iteration times the probability of achieving the target outcome on that iteration. In this example, the player is equally likely to achieve the target outcome on each of 47 possible iterations. The probability in each case is 1/47, as there are 47 cards remaining in the 52-card deck, and only one of them, the 10(d), provides the player with the target outcome. The individual products are then added up. The expected winnings for the player are then:

$$1/47\times400\ \text{tokens}+1/47\times50\ \text{tokens}+1/47\times40\ \text{tokens}+1/47\times30\ \text{tokens}+1/47\times25\ \text{tokens}+\ldots+1/47\times6\ \text{tokens}=18.51\ \text{tokens}$$

The expected winnings for the player in the second version is 18.51 tokens, comparable to the player's expected winnings in the first version. Advantageously, in the second version, the player is guaranteed at least 6 tokens. In the first version, the player might have won nothing, and may have been very disappointed.

For a particular combination of primary outcome and target outcome, the gaming device may have a pre-stored payout table. Alternatively, the gaming device may generate the payout table only after a primary outcome has been achieved and a target outcome has been specified. Then, based on the particulars of the game, the gaming device may determine the probability of achieving the target outcome in each of one, two, three, etc., iterations. The gaming device may then assign payouts for achieving the target outcomes in each of one, two, three, etc., iterations so as to keep the expected winnings for the player below that of the player's wager.

A gaming device may be constrained to assign payouts corresponding to one, two, three, etc. iterations in such a way as to result in a required expected payout. However, there may remain significant leeway in how the payouts are assigned. For example, at one extreme, all payouts are the same, regardless of the iteration on which the player achieves the target outcome. In this case, each payout would be equal to the expected payout. Typically, but not always, the payout for achieving the target outcome on the first iteration will be larger than the payout for achieving the target outcome on the second iteration, and the payout for the second iteration larger than that for the third, and so on.

Accordingly, the gaming device may work under the additional constraints of setting the payout for the first iteration at some multiple of the payout for the second iteration, and the payout for the second iteration at some multiple of the payout for the third iteration, and so on. For example, for a target outcome that must be achieved in, at most, five iterations, a gaming device may be required to set the payout table such that the expected payout is 24 coins, and the payouts are in the proportion 11:8:6:4:1. If a player is equally likely to achieve the target outcome on each of the five iterations, then the payout table must be: 44, 32, 24, 16, 4, with each number corresponding to its respective iteration. Aside from a required expected payout, and a required proportion between the sizes of the prizes for the different iterations, there are many other constraints that might be placed on a payout table.

A payout table may display payouts in absolute terms or as a function of bet size. For example, a payout may be listed as "10 coins" or it may be listed as "10×", which would be ten times the player's bet. For instance, if the player were to bet 3 coins and win a "10×" payout, he would win 30 coins.

In one embodiment, a payout table may take the form of a two dimensional grid. Along one axis, the numbers of iterations required to hit the target outcome may be provided. Along another axis, the possible target outcomes may be indicated. Thus, each entry would specify a payout for hitting a specific target outcome in a specific number of iterations. FIG. 13 depicts an exemplary representation 1300 of such a generalized payout table. By viewing a generalized payout table, a player can see how much he will win for achieving a straight in 4 iterations, or how much he will win for achieving a flush in 6 iterations.

A player who is not satisfied with a particular payout table may select a different target outcome, allow the gaming device to generate a new payout table, and determine whether to accept the new table.

Figure 12:
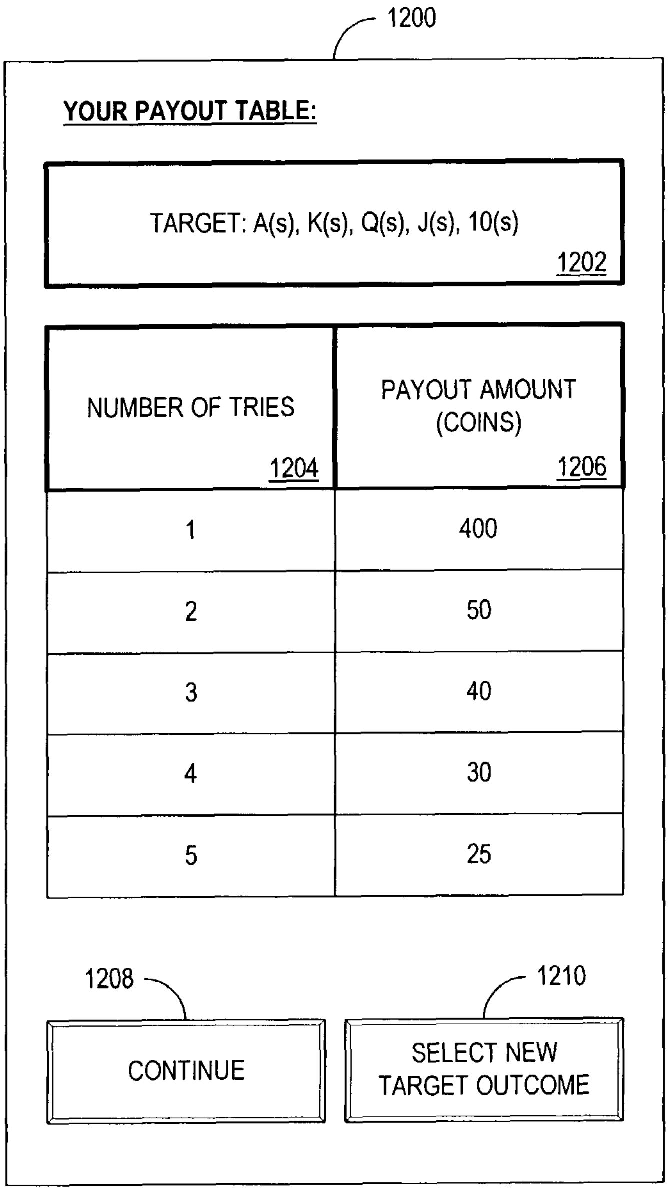
FIG. 12 is a display according to another embodiment.

FIG. 12 is an exemplary representation of a display 1200 of a payout table on a screen. Having just selected a target outcome, a player might view the resultant payout table shown in FIG. 12, and might then determine whether to accept the payout table or to select a new target outcome with a payout table potentially more suited to the player's taste. Display 1200 represents the target outcome 1202 and indicates a number of tries 1204 corresponding to a number of iterations that will be required to achieve the target outcome, in association with a payout 1206 for achieving the target outcome on that try. Representative display 1200 always includes a "Continue" button 1208 and a "Select New Target Outcome" button 1210. According to some embodiments, the player is able to request a different target outcome if he does not want to accept the displayed target outcome. For instance, the player may not feel the payout table is favorable.

In another embodiment, the player may specify all or part of a payout table. For example, the player may select the payout for achieving the target outcome in one iteration. The gaming device may then set remaining payouts so as to maintain a certain expected payout. If a player tries setting too many payouts, with a resultant guaranteed advantage to the player, then the gaming device may prevent the player from doing so. For example, the player is prevented from selecting a payout amount over 300 for achieving his target outcome in one iteration. This is because, with a payout of 300 for the first iteration, the gaming device would not be able to select any combination of payouts for other iterations that would offset the expected value given the player by his selection.

Once a payout table has been generated for a particular combination of primary and target outcome(s), the payout table may be stored, for example, in the offer tracking database 318.

Once a target outcome has been chosen or designated and the player has accepted the target outcome, the player may place a wager. To place the wager, the player may insert coins or bills into the gaming device, in a manner well known in the art. The player may press buttons or areas on the touch screen indicating how many coins or credits are to be wagered from a credit balance on the machine.

In some embodiments, the player places a wager prior to the generation of the primary outcome. In such cases, the player need not necessarily place an additional wager after the primary outcome has been generated.

In some embodiments, once the player has placed a wager, the gaming device generates a secondary outcome. In a video poker, video blackjack, or other card game embodiment, for example, a secondary outcome may be generated by sequentially selecting one or more cards from an electronic deck of cards stored in memory. For example, if the primary outcome is: A(d), K(d), Q(d), 6(s), 5(s), and the target outcome is A(d), K(d), Q(d), J(d), 10(d), then the secondary outcome is generated by replacing the 6(s) and 5(s) with two cards from the top of an electronic deck of cards stored in the memory of the gaming device. Of course, the cards need not come from the top of the deck, but may be drawn from the bottom, drawn from some other consistent location, or drawn randomly.

In an example of a reel slot machine embodiment, a gaming device may use a random number generator to select a symbol for one or more of the reels being re-spun. Although a reel may have twenty symbols, each symbol need not occur with equal probability. For example, 10 outputs of the random number generator may correspond to a first symbol on a reel, whereas only 5 outputs of the random number generator correspond to the second symbol on the reel.

In some embodiments, it is desirable for a gaming device to be able to generate a target outcome without significantly altering its operations. For example, many three-reel slot machines are currently programmed to generate an outcome involving symbols on all three reels. To generate an outcome involving the re-spin of only a single reel might require significant modification of the hardware or software of the slot machine. Therefore, in one embodiment of this invention, a secondary outcome may be generated by 1) continuously generating potential secondary outcomes 2) determining whether the potential secondary outcomes match characteristics of the primary outcome and 3) designating the current outcome as a secondary outcome only if the current outcome has characteristics matching those of the primary outcome. As an example, suppose the primary outcome on a three-reel slot machine is "lemon-lemon-bell". A player designates the target outcome as "lemon-lemon-lemon", and wishes to re-spin only the third reel of the slot machine. Unfortunately, the slot machine is not programmed simply to re-spin the third reel. So the slot machine spins all three reels and gets "orange-cherry-bar". However, "orange-cherry-bar" is not a proper secondary outcome, since obviously, it would not occur if only the third reel were spun from the primary outcome. So the slot machine spins again and gets "bar-cherry-bar". Once again, this is not a proper secondary outcome. The slot machine spins again and gets "lemon-lemon-orange". "Lemon-lemon-orange" is a proper secondary outcome, since it could conceivably occur from the primary outcome by spinning only the third reel of the slot machine. So "lemon-lemon-orange" becomes the first secondary outcome. The process then repeats itself until the player achieves the target outcome.

In some embodiments, each secondary outcome may be generated from a primary outcome or from a prior secondary outcome. For example, a primary outcome in video poker is: A(h), K(h), Q(h), 6(s), 2(s). From the primary outcome, the player chooses to discard the 6(s) and 2(s) and to draw two more cards, in an attempt at a royal straight flush. The first secondary outcome comes up as: A(h), K(h), Q(h), J(h), 8(d). Since the first secondary outcome is not a royal straight flush, the player must draw again. In some embodiments, the player would have to draw again from the primary outcome. That is, the player's hand would revert to: A(h), K(h), Q(h), 6(s), 2(s), and the player would once again discard the 6(s) and 2(s) and draw two more cards.

In other embodiments, the player would keep the most recent secondary outcome as his current hand, in this case, A(h), K(h), Q(h), J(h), 8(d). Then, the player would have to draw only a single card, discarding the 8(d). In still other embodiments, the player would have the opportunity to choose the outcome from which to generate a new secondary outcome. So the player might choose to draw from the A(h), K(h), Q(h), 6(s), 2(s), or from the A(h), K(h), Q(h), J(h), 8(d). Had there been other secondary outcomes, the player might have chosen to draw from these too. The payout tables may or may not adjust based on the outcomes from which the player chooses to draw. Now, if the player does repeatedly draw from the same outcome, e.g., the primary outcome, then, in many embodiments, the cards remaining in the virtual deck of cards are reshuffled. Otherwise, the player would always get the same secondary outcome. The above applies to slot machines and other gaming devices as well as to video poker. For example, given a primary outcome of "bar-bar-lemon" and a secondary outcome of "bar-bar-bell", a player might have the third reel re-spun from the "lemon" position, or from the "bell" position.

In a video poker embodiment, secondary outcomes may be generated from an infinite deck, from a constant deck, or from a diminishing deck. In an infinite deck embodiment, the likelihood of drawing any card (with the possible exception of cards currently in the player's hand) is the same. In a constant deck embodiment, any cards that are discarded are put back into the virtual deck, though possibly only after the next secondary outcome is generated. With an infinite deck or a constant deck embodiment, a player may conceivably draw indefinitely without achieving the target outcome. In a diminishing deck embodiment, cards drawn from the deck are discarded and not reinserted into the deck. Eventually, the player will then obtain the card or cards he needs.

Once again, the above may apply to a slot machine embodiment. When a player re-spins a reel of a slot machine, the player may or may not be able to obtain the same symbol. For example, once the player obtains a symbol, that symbol may be removed from the set of possible symbols to be achieved on the third reel. Thus, by ultimately eliminating all unwanted symbols, a player is guaranteed to achieve his target outcome.

In various embodiments of the present invention, the gaming device maintains an iteration count, which begins at zero and increments by one every time a secondary outcome is generated. For example, after the first secondary outcome is generated, the iteration count reads "1". After the $5^{th}$ secondary outcome is generated, the iteration count reads "5". The iteration count allows the gaming device to determine how much to pay to the player when the player finally does achieve the target outcome. There are many other algorithms for changing the iteration count. For example, the iteration count may begin at "1" and only increment if the secondary outcome does not match the target outcome. The iteration count may be displayed to the player using an LCD display or other display means attached to the gaming device. In some embodiments, the iteration count may include a count of a number of primary outcomes generated prior to starting to generate secondary outcomes. The iteration count may be stored in a database such as offer tracking database 318.

In one or more embodiments, the gaming device executes a program (e.g., program 303) to compare the secondary outcome to the target outcome. If, for example, a symbol by symbol correspondence is necessary, the gaming device may compare each symbol in the secondary outcome with each symbol in the target outcome. Order may or may not matter, as appropriate to the terms of the offer and/or the rules of the game. Typically, but not always, if all symbols in accordance, then there is a match.

In some cases, the target outcome is really a set of outcomes. For example, a target outcome of "straight flush" in video poker may be achieved with numerous individual outcomes, such as: J(d), 10(d), 9(d), 8(d), 7(d). In this case, the video poker machine may do other tests on the secondary outcome to determine whether it meets the criteria of a target outcome. For example, to determine whether a secondary outcome is a straight flush, the video poker machine may check to see that all cards are of the same suit and that all cards are of consecutive denominations.

If the secondary outcome matches the target outcome, then the processor of the gaming device may execute instructions to look up the iteration count, such as may be stored in offer tracking database 318. The gaming device then matches the iteration count to the payout table for the appropriate payout, as indicated in the offer tracking database 318. The gaming device then pays the player accordingly, by, for example, incrementing the player's credit balance, by depositing coins into the player's tray, or by providing the player with some other benefit.

In one example, a player is playing video poker, and drawing to a target outcome of a full house. It takes the player 11 tries to achieve the full house. Once the player achieves the full house, the gaming device looks up the iteration count, and finds it to be 11. The gaming device then consults the payout table for the current offer (e.g., by accessing offer tracking database 318) and finds that 11 iterations warrants a payout of two coins. Therefore, the gaming device drops two coins into the player's tray.

If the secondary outcome does not match the target outcome, then the steps of generating a secondary outcome and determining whether the secondary outcome matches the target outcome are repeated.

Figure 7:
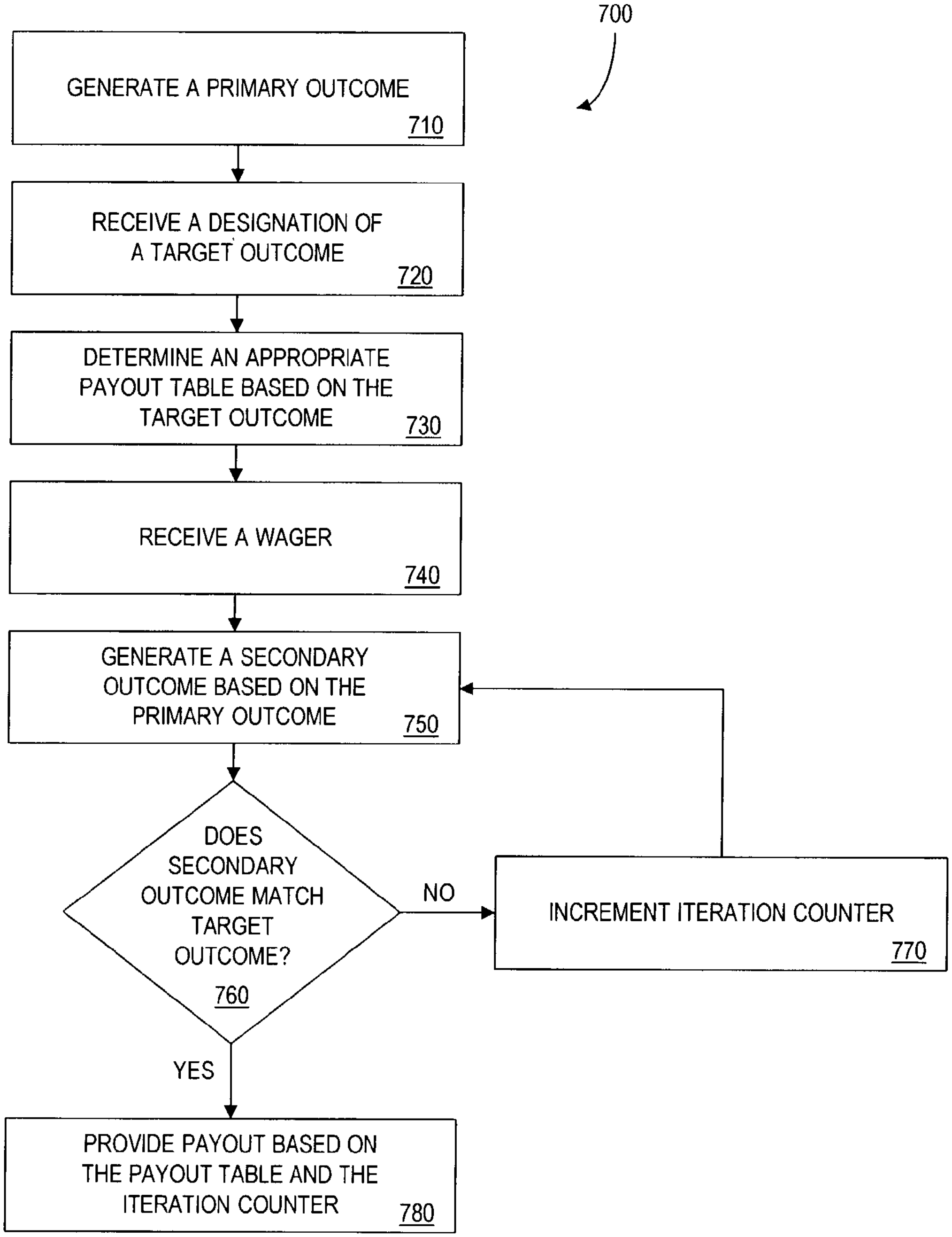
FIG. 7 is a flow chart representing one embodiment of a process that may be performed by a gaming device.

Referring to FIG. 7, a flow chart 700 represents an embodiment of the present invention that may be performed by a gaming device, including, without limitation, a slot machine or video poker machine. The particular arrangement of elements in the flow chart of FIG. 7, as well as the other flow charts discussed herein, is not meant to imply a fixed order to the steps; the steps can be practiced in any order that is practicable for various embodiments of the present invention.

The gaming device generates a primary outcome in a manner well known in the art (step 710). Using an example of a player playing at a slot machine the player initiates play of a slot machine game (e.g., by pulling a handle or pressing a button). In another example, the gaming device generates the primary outcome without the player initiating play (e.g., by generating the primary outcome automatically, such as in response to a signal from server 102). In another example, referring to tabular representation 500 of offer tracking database 318, the gaming device generates a primary hand of A(hearts), K(hearts), Q(hearts), J(hearts), 6(clubs).

The gaming device receives a designation of a target outcome (step 720). For example, the player selects a target outcome to be achieved (e.g., by selecting the target outcome from a displayed menu).

In another example, the gaming device accesses player database 208 based on a received player identifier (e.g., a player tracking card number read by the gaming device) and determines a target outcome preferred by the player. In one example, referring to tabular representation 500 of offer tracking database 318, the player selects a hand of A(h), K(h), Q(h), J(h), 10(h) as a target outcome.

The gaming device determines an appropriate payout table based on the target outcome (step 730). For example, the payout table may associate a particular outcome iteration with a respective payout amount. In some embodiments, the payout table is also determined based on the primary outcome. For example, the payout amounts may correspond to how easy it will be to achieve the target outcome based on the primary outcome.

The gaming device receives a wager (step 740). The player typically inserts a monetary amount (e.g., coins, bills, tokens, chips, credit card, cashless gaming ticket) or otherwise has an amount of funds available to wager, and indicates a wager amount (e.g., by pressing buttons). The wager may be received prior to or after the generation of the primary outcome (step 710).

The gaming device generates a secondary outcome based on the primary outcome (step 750). In one example, if the primary outcome comprises a first game element (e.g., a "cherry" reel symbol) and a second game element, the secondary outcome will contain the first game element but may generate a third game element to replace the second game element. The gaming device then determines whether the generated secondary outcome matches the target outcome (step 760). For example, if the target outcome is a particular hand or type of hand in a poker game (e.g., a straight flush, or four aces), the gaming device compares the secondary hand with the designated target outcome to determine whether the target outcome has been achieved on this iteration.

If the secondary outcome does not match the target outcome (i.e., if the target outcome has not yet been achieved), the gaming device increments an iteration counter (step 770), for example, the number of iterations 508 field depicted in tabular representation 500 of offer tracking database 318. In this way, the gaming device can track how many secondary outcomes were generated before achieving the target outcome. The process then proceeds with the generation of another secondary outcome based on the primary outcome (step 750).

If, however, the secondary outcome does match the target outcome, the player is provided with a payout based on the determined payout table and the number of iterations (e.g., the number of secondary outcomes) required to achieve the target outcome (step 780). Preferably, the payout provided on achieving the target outcome corresponds to an amount that is greater than zero (e.g., a positive payout amount). For example, referring to tabular representation 500 of offer tracking database 318, if the third secondary outcome to be generated (e.g., the secondary outcome that is generated on the third iteration according to the iteration counter) matches the target outcome (e.g., A(h), K(h), Q(h), J(h), 10(h)), a credit balance of the player is increased in the amount of forty credits.

For example, an appropriate entry of the player database may include a field that stores a financial account identifier, indicating a bank account, a credit card account or account with the casino. The financial account may be updated (e.g., an amount of funds transferred to the account in accordance with the player winnings). The appropriate entry of the player database may alternatively or additionally include a field that stores the balance, or updates an amount of aggregate balances the player has won.

In one example embodiment of the present invention, a player approaches a video poker machine and places a wager for a game in a manner well known in the art. In a manner well known in the art, after placing the wager the player receives a hand of five cards, selects any number of the five cards in the hand to discard, receives replacements for any discarded cards, and then receives a payout based on the final hand. For example, if the final hand is a predetermined winning hand, the player will receive a payout.

The player places several such wagers and receives several corresponding initial hands, but he is not having much success at achieving winning final hands from the initial hands. Then, the player is dealt an initial hand of: A(spades), K(spades), Q(spades), J(spades), 3(hearts). The player thus has an opportunity to hit a royal straight flush, the best possible outcome, by discarding the 3(hearts) and drawing a new card for a final hand. With a standard deck, the player has a 1 in 47, or 0.02128 probability of drawing the 10(spades) in the final hand for the royal straight flush in spades (e.g., there are forty-seven cards remaining in the deck in the initial hand is dealt, of which only one card, 10(spades), can achieve the desired outcome). As the player really wants to hit the royal straight flush, rather than simply discarding the 3(hearts) and drawing a new card for a final hand, thereby ending the game, he decides to select a "Guaranteed to Win" option from the touch screen of the video poker machine.

In response, the video poker machine asks the player what his desired target outcome is. It suggests the royal straight flush in spades: A(spades), K(spades), Q(spades), J(spades), 10(spades), and the player agrees by selecting a "Continue" option on the touch screen. Then the display screen of the video poker machine displays a payout table associated with the guaranteed outcome. The payout table indicates that if the player draws the 10(spades) in one try, he will receive 400 tokens. If he draws the 10(spades) on the second try, he will receive only 50 tokens. If he draws the 10(spades) on the third try, he will receive only 40 tokens, and so on.

The player presses a "Continue" button, indicating that he is satisfied with the payout table corresponding to his selected target outcome and accepts the offer for the guaranteed outcome. Because the player placed a wager at the start of the game, before receiving the initial hand, he does not have to place a new wager. The player presses a "Draw" button on the video poker machine, and the gaming device displays a new hand: A(s), K(s), Q(s), J(s), 8(d). The player has not made his royal straight flush; however, because the player was guaranteed to achieve the target outcome, this is not a final hand; the player may continue playing. He presses the "Draw" button again, and the video poker machine replaces the 8(d) with another card. The player continues receiving hands without placing any additional wager after the initial hand, until the player draws the 10(s) to achieve the royal straight flush. For hitting the royal straight flush on the fifth iteration after the initial hand the player receives twenty-five tokens and enjoys the winning experience.

Figure 8:
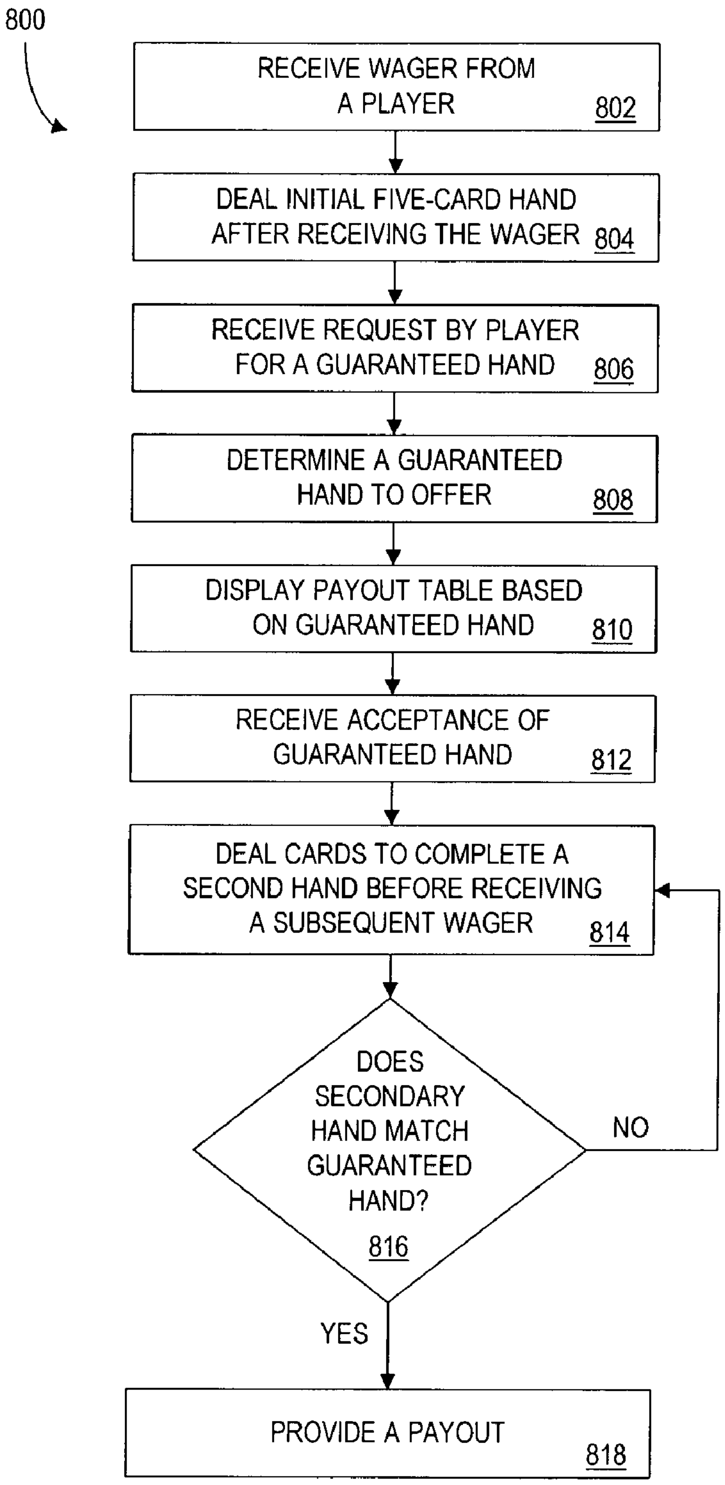
FIG. 8 is a flow chart representing one embodiment of a process that may be performed by a gaming device.

Referring to FIG. 8, a flow chart 800 represents an embodiment of the present invention that may be performed by a gaming device, including, without limitation, a video poker machine and a video slot machine. The particular arrangement of elements in the flow chart of FIG. 8, as well as the other flow charts discussed herein, is not meant to imply a fixed order to the steps; the steps can be practiced in any order that is practicable for various embodiments of the present invention.

A video poker machine receives a wager from a player (step 802). The gaming device deals an initial hand of five cards after receiving the wager (step 804). The video poker machine receives an indication of a request by the player for a guaranteed hand (step 806). For example, the player may indicate his desire for a guaranteed hand by pressing an appropriate button of the video poker machine or otherwise selecting an option to achieve a target hand. The video poker machine then determines a guaranteed hand of five cards to offer to the player (step 808). For example, the video poker machine determines a unique five-card hand (e.g., royal straight flush in spades) or a poker hand grouping (e.g., royal straight flush, four-of-a-kind) to offer to the player as a target hand. In some cases, the video poker machine may determine the guaranteed hand from the request (e.g., the request may indicate a target outcome desired by the player). In one embodiment, the guaranteed hand includes at least one card from the initial hand.

The video poker machine then displays at least a portion of a payout table based on the guaranteed hand (step 810). In one example, the payout table indicates one or more payout amounts, in which each potential payout amount corresponds to a total number of hands dealt before the guaranteed target outcome is achieved (e.g., corresponds to an iteration count). FIG. 12 is an exemplary representation of a display 1200 of a payout table and is described in detail above.

Referring again to FIG. 8, the video poker machine then receives an indication that the player accepts the offer for the guaranteed hand (step 812). The gaming device then deals cards to complete a second hand of five cards before receiving any wager subsequent to the first wager (step 814), and determines whether the second hand matches the guaranteed hand (step 816). For example, based on the guaranteed hand to be achieved, either the player or the gaming device holds and/or discards cards of the first hand as appropriate. The gaming device then replaces any discarded cards to generate a second hand, and determines whether the second hand includes each of the five cards of the guaranteed hand. The video poker machine provides a payout if the second hand includes five cards that match the guaranteed hand (step 818). If the target hand is not achieved, the gaming device then deals a third hand of cards (step 814) and the process continues until the guaranteed hand is achieved.

In another example embodiment, a player sits down at a three-reel video slot machine. She reads the following instructions on the display screen of the machine:

Keep spinning until you get three starting symbols you like.

Then, select one reel you want to individually re-spin, and select the symbol you want it to hit.

We will show you a payout table that tells you how much money you'll get if you hit your symbol on the first re-spin, how much money you'll get if you hit your symbol on the second re-spin, and so on.

Then, select the number of coins you would like to bet.

Begin re-spinning!

After reading the instructions, the player begins making handle pulls at the slot machine. She is not satisfied with her first few results, but eventually receives an outcome of "lemon-cherry-lemon". She decides she would like to achieve an outcome of "lemon-lemon-lemon". Accordingly, she selects the second reel by touching the second reel on the video slot machine. A menu is displayed by the video slot machine, showing nine different symbols from which she can choose. From the menu of symbols, she selects "lemon". The gaming device then displays a payout table indicating that, for a wager of two coins, the player would win six coins by hitting the third "lemon" on the first re-spin of the second reel, four coins for achieving "lemon-lemon-lemon" on the second re-spin, two coins on the third, and one coin for any re-spin thereafter. The player decides to accept the offer for the guaranteed outcome of "lemon-lemon-lemon" and wagers two coins. On her fourth re-spin of the second reel, the third "lemon" appears. The player receives one coin back for the wager of two coins.

Figure 9:
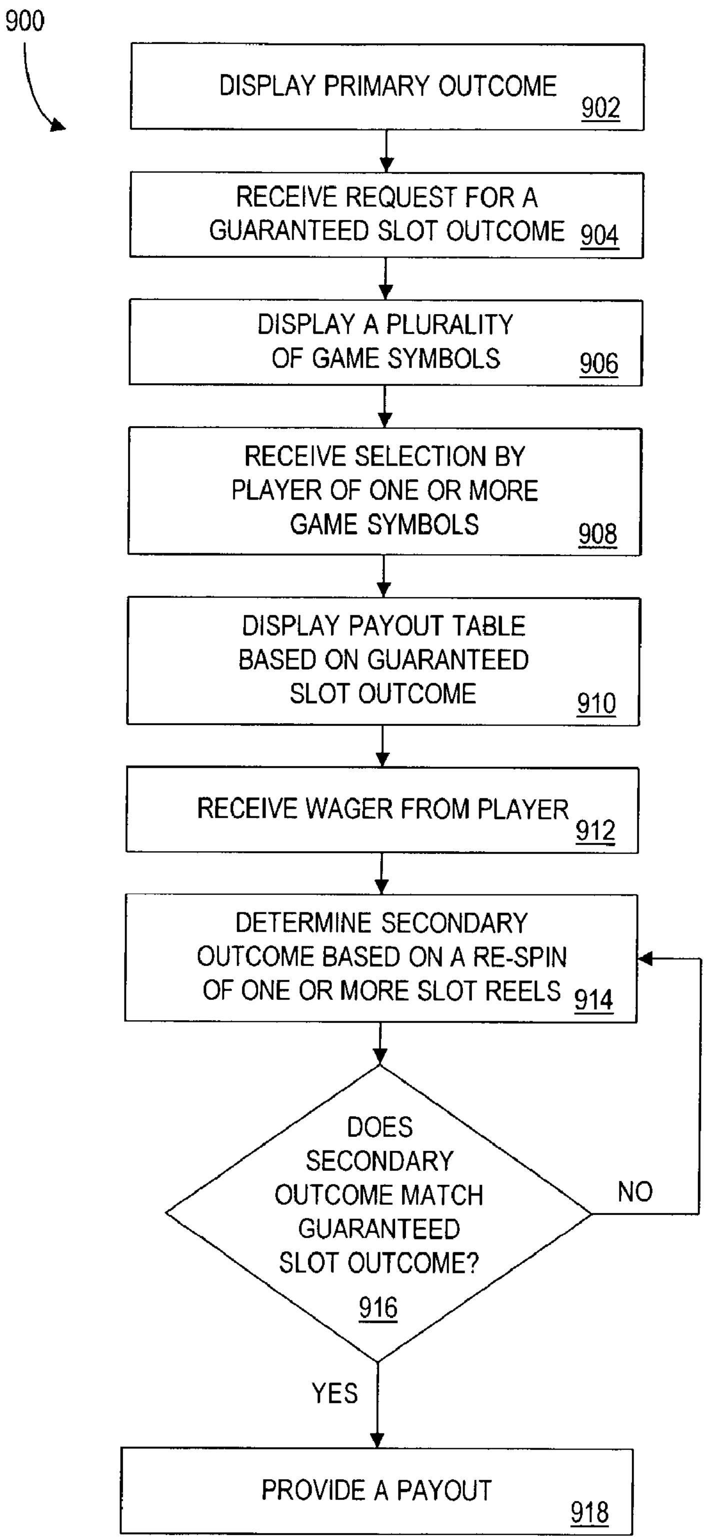
FIG. 9 is a flow chart representing one embodiment of a process that may be performed by a gaming device.

Referring to FIG. 9, a flow chart 900 represents an embodiment of the present invention that may be performed by a gaming device, including, without limitation, a video poker machine and a video slot machine. The particular arrangement of elements in the flow chart of FIG. 9, as well as the other flow charts discussed herein, is not meant to imply a fixed order to the steps; the steps can be practiced in any order that is practicable for various embodiments of the present invention.

A video slot machine displays a primary outcome to a player (e.g., "lemon-cherry-lemon") (step 902). For example, the player may initiate a series of handle pulls before finding an outcome he likes. The gaming device then receives a request by a player for one or more guaranteed slot outcomes (e.g., "lemon-lemon-lemon") (step 904). Alternatively, the gaming device receives a request by a player for one or more guaranteed game symbols. It will be understood that by requesting a particular outcome (e.g., comprising a plurality of symbols), the player may implicitly or explicitly be requesting a guarantee that one or more particular symbols will be achieved. In one example, the request may indicate a particular reel at which the player desires a reel symbol to appear. In another example, the player may wish to guarantee the occurrence of a particular symbol at a particular reel of a slot machine game, or at a particular position in a hand of cards. In some additional embodiments, the player requests a target outcome that encompasses more than one payline of a slot machine. In one embodiment, a guaranteed slot outcome (e.g., "lemon-lemon-lemon") includes at least one reel symbol from a primary outcome (e.g., "lemon-cherry-lemon").

After receiving the request, the gaming device preferably displays a plurality of game symbols (e.g., slot reel symbols) to the player (step 906) from which the player may select one or more game symbols in accordance with the slot outcome he wants to guarantee will be achieved.

In one embodiment, the player selects from a menu each card or each symbol in the target outcome. For example, the player begins by selecting the first card in the target outcome. He highlights "Ace" in a denomination menu, and highlights "hearts" in a suit menu. The player has thereby selected the ace of hearts. He then repeats the process for the second through fifth cards. FIG. 11 shows an exemplary display 1100 from which a player selects target outcomes and is described above.

Referring again to FIG. 9, the video slot machine receives an indication of a selection by the player of at least one game symbol (e.g., "cherry") from the plurality of game symbols (step 908). As discussed above, in some embodiments the slot machine may also receive an indication of a selection by the player of a particular position (e.g., slot reel) at which the player wants to guarantee the symbol will occur.

The video slot machine then displays at least a portion of a payout table based on the guaranteed slot outcome (step 910), in a manner described above with respect to FIG. 8. In one example, the payout table indicates one or more payout amounts, in which each potential payout amount corresponds to a total number of re-spins of one or more reels before the guaranteed target outcome is achieved (e.g., corresponds to an iteration count).

The video slot machine then receives a wager from the player (step 912). In some embodiments, the wager indicates an acceptance by the player of an offer for the guaranteed slot outcome. The video slot machine then determines a secondary outcome based, for example, on a re-spin of one or more reels (step 914). In various embodiments, the gaming device re-spins the appropriate reels (e.g., any that do not match the target outcome) before receiving any wager subsequent to the wager already received. The video slot machine then determines whether the secondary slot outcome matches the guaranteed slot outcome (step 916). The video slot machine provides a payout if the secondary slot outcome includes reel symbols that match the guaranteed slot outcome (step 918). In some embodiments, the payout is based on the number of re-spins after receiving the wager (e.g., the number of iterations). If the target outcome is not achieved, the gaming device then re-spins any reels that do not match (step 914), and the process continues until the guaranteed slot outcome is achieved.

Although flow chart 900 is described primarily with respect to a slot machine, it will be understood by those having ordinary skill in the art that various processes described herein with respect to slot machines may be configured appropriately to other types of games of chance, including without limitation video poker, and vice versa. For example, rather than guaranteeing a slot outcome, a player at a video poker or video blackjack machine may guarantee a target hand by selecting one or more card symbols.

In another example embodiment, a player playing games at a three-reel video slot machine has lost $50 within the last twenty minutes. The player is tempted to leave the machine, but also considers that the video slot machine might just need to be put off its "losing streak." The player notices an area of the touch screen of the video slot machine that says, "Play until you win!" The player presses the button and saw the following instructions appear on the screen: "Play 6 coins and you can keep on spinning until you win! Your prize will correspond to a one-coin wager." The screen also provides a "Continue" button to accept the offer to play until he wins and a "Cancel" button to decline the offer.

The player presses the "Continue" button to accept the offer and play until he wins. The video slot machine accepts a wager of six coins from the player. Then the player begins initiating a series of spins. The first five spins do not result in a winning outcome for the player. On the sixth spin, however, the player receives an outcome including one "cherry" reel symbol, which pays out three coins (e.g., the amount the player would have won if he had received the outcome on a standard one-coin wager). Although the player had lost a total of three coins on his original six-coin wager, he had gotten his guaranteed win, after five losing spins, without having to place any additional wagers. If the player is confident that the machine is now over its losing streak, the player may decide to return to playing one wager per pull.

Figure 10:
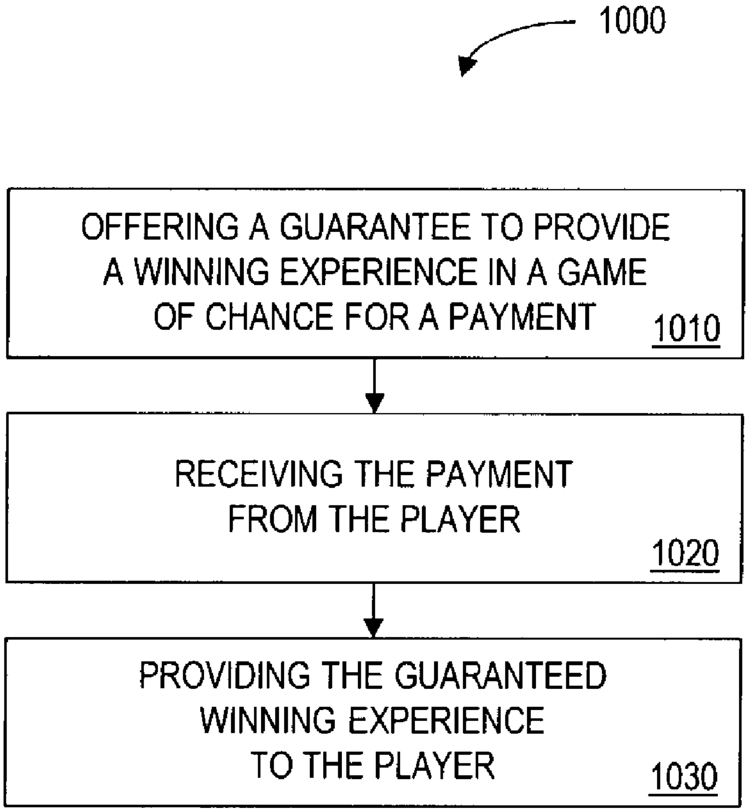
FIG. 10 is a flow chart representing one embodiment of a process that may be performed by a gaming device.

Referring to FIG. 10, a flow chart 1000 represents an embodiment of the present invention that may be performed by a gaming device, including, without limitation, a video poker machine and a video slot machine. The particular arrangement of elements in the flow chart of FIG. 10, as well as the other flow charts discussed herein, is not meant to imply a fixed order to the steps; the steps can be practiced in any order that is practicable for various embodiments of the present invention.

The gaming device provides an offer to a player, the offer including a guarantee of providing a winning experience in a game of chance, in exchange for a payment (step 1010). The gaming device receives a payment from the player (1020). The gaming device also provides the guaranteed winning experience to the player (1030) in accordance with the offer.

In some embodiments, the player may be offered a winning experience comprising a guaranteed benefit. For example, the guaranteed benefit may comprise allowing the player to spin at least one reel of a slot machine as many times as necessary to achieve an outcome that corresponds to a payout amount that is greater than zero. Similarly, the guaranteed benefit may comprise allowing the player to receive as many hands of cards (or other sets of game symbols) as is necessary to achieve an outcome that corresponds to a payout amount that is greater than zero.

In some embodiments, the guaranteed benefit comprises allowing the player to spin at least one reel of a slot machine as many times as is necessary to achieve a payout amount that is greater than a predetermined threshold. For example, in exchange for providing a payment (e.g., $12), the player may be allowed to re-spin, without providing any additional payment, as many times as is necessary to accumulate a number of credits above a particular threshold (e.g., $10). For instance, one spin may correspond to a $2 payout, and another spin may correspond to a $4 payout, and so on. The player may re-spin without additional wagering until the accumulated payout amount reaches or exceeds the threshold.

In some embodiments, the guaranteed benefit comprises allowing the player to spin at least one reel of a slot machine as many times as is necessary to achieve a predetermined outcome. For example, as described variously herein, in exchange for a payment, the player may be guaranteed the ability to play a game of chance through any number of iterations (e.g., generation of outcomes) until the occurrence of a particular outcome (e.g., a target outcome).

In some embodiments, the guaranteed benefit comprises a positive payout that is based on the number of iterations that were necessary to achieve a target outcome.

5. Additional Embodiments

The following are several examples which illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

The gaming device may perform some or all of the described functions of the server. Similarly, the server may perform some or all of the described functions of the gaming device.

In some embodiments of the present invention, a player is always allowed to achieve a winning outcome in a game of chance. Thus, in some embodiments, a player can avoid being disappointed by missing a winning outcome. Furthermore, the player can always force a "cold" machine to win, thereby breaking a cold streak.

In an additional embodiment, a player playing a video poker game at a gaming device has an initial hand: J(d), 10(c), 8(h), 7(h), 6(h). He chooses to discard the J(d) and 10(c) and to go for a straight flush in hearts. The straight flush would be achieved by drawing any of the following combinations of cards: 10(h) 9(h); 9(h) 5(h); or 5(h) 4(h). After four iterations of drawing two cards, the player draws the K(s) and 9(h). The player holds onto the 9(h) and discards the K(s). Play of the game then continues with the video poker machine drawing only one card at a time on each successive iteration, holding 9(h), 8(h), 7(h), 6(h). After another four iterations, the player finally draws the 5(h) to achieve the target straight flush. Thus, some embodiments of the present invention provide for a process in which game elements or symbols that match elements of a target outcome may be accumulated over more than one iteration. For instance, in the example above, each iteration of secondary outcome generation need not be based on the primary outcome of J(d), 10(c), 8(h), 7(h), 6(h). Instead, game elements, such as the 9(h), may be retained (either in response to input from a player or automatically by the gaming device) from one iteration if they match elements of the target outcome. A subsequent secondary outcome (e.g., 9(h), 8(h), 7(h), 6(h), 5(h)) may thus be generated based on a prior secondary outcome (e.g., K(s), 9(h), 8(h), 7(h), 6(h)).

In some embodiments the number of iterations on which the payout is based may include the generation of the primary outcome. For example, the iteration counter may count the generation of the primary outcome.

In various embodiments, the gaming device receives a player tracking card from a player and reads information from the player tracking card in a manner known in the art. Typically, the player tracking card stores a unique player identifier, which in turn may be used to access information (e.g., from a record of a database indexed by the player identifier) from the server. The information may be, for example, an entry of the player database. The gaming device may thus access information such as a preferred target outcome or a preferred primary outcome of the player.

As mentioned previously, a generalized payout table, such as the exemplary payout table depicted in FIG. 13, may contain two dimensions: the number of iterations required to hit a particular outcome; and the various outcomes themselves. Payout tables in common use today are a special case, where the payout is zero for any number of iterations greater than 1 (i.e., the player loses if he does not achieve a target outcome on the first pull).

Another special case of the generalized payout table is where the payout is independent of time. That is, where a person will receive the same payout for hitting "orange-orange-orange" after three pulls as after 100 pulls. A payout table that is independent of time may provide important psychological advantages to a player. For example, with such a payout table, the player is guaranteed to win, and furthermore, it does not matter to the player how long it takes to win. Therefore, the player need not worry about "cold streaks". In fact, a player might prefer a time-independent payout table so as to weather a machine's "cold streak" without losing significant amounts of money.

A time-independent payout table will, in many embodiments, require a different wager than many payout tables currently in common use. This is because, with a time independent payout table, the player always wins a payout. Therefore, the wager may be set so as to be larger than some of the smaller prizes, so that the casino still has an expected profit for each wager the player makes.

For example, imagine that there are three possible winning outcomes at a slot machine: "cherry-cherry-cherry", "lemon-lemon-lemon" and "bar-bar-bar". The first pays 3 coins and occurs with probability 1/10 on every spin. The second pays 10 coins and occurs with probability 1/50 on every spin. The third outcome, "bar-bar-bar" pays 1000 coins, and occurs with probability 1/10,000 on every spin. The game ends after the player achieves one of the winning outcomes. Since the player is ultimately guaranteed to achieve one of the three winning outcomes, one need only compute the probability that a player will get "cherry-cherry-cherry" before getting "lemon-lemon-lemon" or "bar-bar-bar". Similarly, one can compute the probability that the player will get "lemon-lemon-lemon" first, or "bar-bar-bar" first.

The probability of the player getting "cherry-cherry-cherry" first is the probability of getting "cherry-cherry-cherry" on any given spin, divided by the probabilities of getting "cherry-cherry-cherry", "lemon-lemon-lemon" or "bar-bar-bar" on any given spin. This is equal to (1/10)/(1/10+1/50+1/10,000)=1000/1201. The probability of the player getting "lemon-lemon-lemon" first is equal to (1/50)/(1/10+1/50+1/10,000)=200/1201. The probability of the player getting "bar-bar-bar" first is equal to (1/10,000)/(1/10+1/50+1/10,000)=1/1201.

Knowing, for each outcome, the payout and the probability that the outcome will occur first, one can compute the expected payout for the player: 3 coins×1000/1201+10 coins×200/1201+1000 coins×1/1201=6000/1201. The expected payout, 6000/1201, is just a little less than 5. Therefore, in the current example, a player might make a wager of five coins and be guaranteed a winning outcome. Most of the time the player would win three coins, with "cherry-cherry-cherry". Sometimes the player would win 10 coins, and occasionally, the player would win 1000 coins. Advantageously, the player would always win something, and yet the casino would expect to make a small profit from the player on each handle pull.

In some cases, a player might put in 50 coins for a guarantee of achieving an outcome paying only 30 coins. The player would be certain to lose money, but would end a gaming device's losing streak. In some cases, a player might put in 50 coins, and be guaranteed to achieve any target outcome paying at least 30 coins.

Although a target outcome is typically a standard winning outcome, such as straight flush in video poker, or three like symbols in a three-reel slot game, the target outcome need not be so. For example, a target outcome in video poker might be K(s), 10(h), 8(h), 6(c), 2(d), or any typically non-winning outcome. The payout table might simply correspond to the difficulty of achieving the target outcome from the primary outcome. For example, if the target outcome differs greatly from the primary outcome, the payout for hitting the target outcome within only a few iterations would be large.

In some embodiments, a player's goal may be to hit each of several target outcomes. For example, the player holds four cards to a royal straight flush in video poker. One target outcome might be a straight, another target outcome might be a flush, and another might be a straight flush. The player might draw cards until he achieves a straight, then draw cards until he achieves a flush, and then draw cards until he achieves a straight flush. The player may be required to achieve a simple straight or a simple flush before achieving the straight flush. The player may or may not have to proceed in order (e.g., from straight to flush to straight flush). The player's payout may be based on the total number of outcomes generated before achieving all target outcomes. Alternatively, the payout may be some function of the number of outcomes generated between the primary outcome and the first target outcome, and/or between each target outcome and the next target outcome.

Secondary outcomes may be generated automatically by the gaming device. For example, the player may press a button that initiates the rapid drawing of cards until the player achieves his target outcome.

In one or more embodiments, the player is allowed only a certain number of chances to achieve a target outcome. For example, if the player needs one card to complete a royal straight flush, then the player may be allowed to draw five cards in attempting to complete the royal straight flush. However, if none of the five cards complete the royal straight flush, then the player may lose, or may have to make additional wagers so as to draw more cards.

In one embodiment, the player may select the number of chances he would like at achieving the target outcome. For example, a menu might allow the player to select 4 chances, 16 chances, or 20 chances. The player may be required to make varying wagers depending on the number of chances he would like. For example, the player might have to make only a small wager to get 2 chances, but a large wager to get 20 chances, since with 20 chances, the player is more likely to achieve the target outcome. Alternatively, or in addition, the payout tables may change depending on how many additional chances the player has to achieve the target outcome. For example, if the player has many chances to achieve the target outcome, the payout tables may have lower prizes than they would if the player had only a few chances.

In one embodiment, the player wins a prize if he fails to achieve a target outcome after a certain number of secondary outcomes have been generated. For example, if the player holds four cards to a flush in video poker, and can draw 20 additional cards without achieving a flush, then the player might get a large payout. In another embodiment, if the player is given 20 chances to achieve a target outcome, and fails on all 20 chances, the player may be given another 20 chances, possibly with the same payout table. For example, a player might win 100 coins for achieving the target outcome on the first secondary outcome, 50 coins on the second secondary outcome, and so on. If the player does not achieve the target outcome after 20 secondary outcomes, then the player might again receive 100 coins for achieving the target outcome on the $21^{st}$ secondary outcome.

According to one embodiment, a player benefits from all outcomes achieved prior to achieving a target outcome. For example, a player might be drawing to a straight flush in video poker. The player is allowed repeatedly to begin from his primary hand, to discard one card, and to draw another. If the drawn card does not give the player a straight flush, then the player tries again from the same primary hand. If the drawn card gives the player another winning outcome, then the player may receive a corresponding payout, and may still begin anew from the primary hand to draw towards the target outcome. Thus, by the time the player gets his straight flush, the player might have played fifty different hands, each starting with four cards to a straight flush. The player might have achieved five straights, six flushes, and three hands with high pairs, and may have been paid for each.

A player may have multiple target outcomes. After a player achieves a first target outcome, the player may choose to disregard the target outcome and try for a second target outcomes, e.g., by discarding a card from a poker hand and drawing another card. The player might want to disregard a first target outcome if there is a second target outcome that pays more. The player may or may not be forced to accept the first target outcome he achieves.

In one embodiment, a player attempts to achieve certain target outcomes, but loses if he achieves other "poison" outcomes first. For example, the player might win by achieving "lemon-lemon-lemon" at a slot machine. However, the player might lose by achieving "cherry-cherry-cherry". On any other outcome, the player re-spins. As in a prior embodiment, the probability of achieving "lemon-lemon-lemon" before achieving "cherry-cherry-cherry" can be computed. This probability can then be used in determining an appropriate payout for achieving "lemon-lemon-lemon". For example, if there is a 1/11 probability of achieving "lemon-lemon-lemon" before "cherry-cherry-cherry", then the player may receive 10 coins when he achieves "lemon-lemon-lemon".

Instead of poison outcomes, there may be poison symbols. For example, for a single wager, a player might continually re-spin until he achieves a winning outcome, such as "bar-bar-bar" or "7-7-7". However, if a "lemon" appears on any reel, the game might end as a loss for the player. In some embodiments, the player may select the outcomes or the symbols that are the poison symbols. The gaming device may then set the payout tables according to how likely the poison symbols are to occur on each spin, how likely the target outcomes are to occur on each spin, and how much the target outcomes pay. Alternatively, the gaming device may adjust the probability of the occurrence of a poison symbol or of a target outcome so as to maintain a statistical advantage for the casino.

In one embodiment, when a player generates a primary outcome, the primary outcome may become the target outcome. The player must then regenerate the primary outcome in order to win. In some embodiments, certain primary outcomes may win automatically for the player, without the need for the player to regenerate the primary outcome. In other embodiments, once a player has generated a primary outcome, the player must regenerate the same primary outcome before generating one or more poison outcomes. In some additional embodiments, the poison outcomes may be the same as the outcomes that would win automatically for a player were he to generate one of them as the primary outcome.

According to some embodiments, a player may be allowed as many secondary outcomes as he can generate in a given time period in an attempt to achieve a target outcome. If the player does not achieve the target outcome, he may lose. For example, so as to re-spin the third reel of a slot machine, the player is allowed to press the "re-spin" button on a slot machine as many times as he can in a ten-second period. If the player achieves the target outcome within the ten-second period, he wins. Otherwise, he loses. To make the player's task more difficult, a probable card to be discarded from a video poker hand may appear in a different location on the screen for each secondary outcome. The player must then spend time determining where the unwanted card is, before designating it to be discarded.

The amount of time a player is given in which to generate secondary outcomes may depend on the player's primary outcome. If the primary outcome is similar to the target outcome (e.g., only a one-card difference in video poker), then the player may be given only a little time. However, if the primary outcome is dissimilar to the target outcome (e.g., a three-card difference in video poker), then the player may be given more time. The amounts of time may be given in such a manner that a player is equally likely to achieve the target outcome starting from any primary outcome.

In some embodiments, a player might play multiple poker hands simultaneously. Each might be independent of the other. That is, each might comprise cards from different virtual decks of cards. Alternatively, each hand might come from the same deck. With each hand, the player might proceed through the steps of this invention. For example, the player is dealt, say, three primary hands, designates three target outcomes (one for each hand), and continually receives secondary outcomes on each hand. When each hand has reached its target outcome, the game ends. In some embodiments, the game ends when only a subset of the hands have reached their target outcomes. In some embodiments, one or more hands must reach target outcomes simultaneously. For example, when the fifth secondary outcome generated for hand two is the target outcome for hand two, then the fifth secondary outcome generated for hand three must be the target outcome for hand three. Otherwise, each hand might need to generate an additional secondary outcome. Or the game might end as a loss for the player. Similar embodiments apply for a player playing other games, such as three or five-reel slots, video keno, and so on.

In various embodiments, a player might be guaranteed to get into the bonus round of a game at a slot machine. Bonus rounds often consist of simple games or scenarios in which a player has the opportunity to win large prizes, but little or no opportunity to lose money. In an exemplary bonus round, several make-believe characters bid in a make-believe auction. The player receives as a prize the high bid in the auction.

Accordingly, for a given wager, the player would be allowed to spin repeatedly without making further wagers, until the player entered the bonus round. Alternatively, the player might simply begin play in a bonus round. In one embodiment, the size of the player's wager might be related to his expected winnings from a bonus round. Thus, if the player could expect to win 48 coins in a bonus round, his required wager might be 50 coins.

The set of target outcomes may consist of all target outcomes with a payout that is greater than or equal to a threshold amount. Accordingly, if the payout table is time independent, the player is guaranteed a payout of at least the threshold amount.

In some embodiments, all target outcomes associated with a standard payout that is greater than a threshold amount may have their payouts adjusted to be equal to or less than the threshold amount. For example, suppose the threshold amount is 30 tokens. The player is to be paid 30 tokens upon the occurrence of any outcome with a standard payout greater than or equal to 30 tokens. Thus, even if the player achieves an outcome of orange-orange-orange, with a standard payout of 50 tokens, the player would only receive 30 tokens. However, if the player achieves an outcome of bar-bar-cherry, with a standard payout of 3 tokens, then the player gets to spin again. Essentially, the player is guaranteed a payout of exactly the threshold amount. In some embodiments, the player might have to place an initial wager in an amount greater than the threshold amount.

In one embodiment, a player might be guaranteed to win a certain cumulative payout before needing to place a new wager. For example, a player might place an initial wager of 150 coins. The player is then allowed to keep spinning the reels of a slot machine until accumulating at least 100 coins in payouts. So the player might achieve an outcome that pays 40 coins, then achieve three losing outcomes, then achieve an outcome paying 50 coins, then achieve 6 losing outcomes, and finally achieve an outcome that pays 30 coins. The player has now accumulated 120 coins. He receives these as a payout, and the game ends.

In some embodiments, rather than wagering and playing until achieving a winning outcome, a player may play until achieving a winning outcome without wagering. Alternatively, the player provide a payment in exchange for being able to play without making a further payment until achieving a winning outcome. For example, some players might find it beneficial or entertaining to achieve a particular outcome, even if no payout is provided. For instance, although the player does not win a prize, he does end the losing streak of the gaming device.

In some embodiments the player plays, without wagering, until the gaming device generates a certain number of losing outcomes in a row. Then, the presumption is that the gaming device is due for a win, and the player may place a wager if he so wishes. In fact, the player may wait until the gaming device has achieved any desired sequence of outcomes before jumping in and placing a wager.

In some embodiments, the player must pay in order for the machine to make a number or spins in the absence of a wager, even though the player cannot win anything. However, the player may benefit psychologically from the belief that the gaming device is purging itself of losing outcomes, or is getting over a losing streak, and may avoid being frustrated or disappointed. For example, the player pays five coins, and then the gaming device spins 100 times.

In other embodiments, the player earns the right to have a gaming device generate outcomes in the absence of wagers. For example, the player must play an hour in order to have the machine make ten spins in the absence of a wager.

In some embodiments, if the player has the gaming device making a number of free spins, then the gaming device may display some indicator of the gaming device's performance over those 100 spins. For example, an indicator glows red when the gaming device is generating winning outcomes more frequently than normal, and glows blue when the gaming device is generating winning outcomes less frequently than normal. By watching the indicator, the player may choose when to place a wager, or when to allow the gaming device to continue generating outcomes in the absence of a wager.

In one embodiment, a player may continue generating secondary outcomes, but the set of target outcomes may diminish as the player goes through more iterations. For example, within the first three secondary outcomes in video poker, the player may win on any pair. However, after the first three outcomes, the player needs at least two pair to win. After the first six outcomes, the player may need at least three of a kind to win.

In an exemplary video blackjack embodiment, a player may begin with a single card, such as, without limitation, an ace, king, queen, jack, or ten. The player may generate secondary outcomes by drawing a second card. If the second card makes a blackjack (i.e., an ace and a face card or a ten) for the player, then the player wins. Otherwise, the player draws a new second card, and the iteration counter increments by one.

In another embodiment, the player begins with a two-card hand and keeps hitting until he reaches a point total of 21. If the player goes over 21, then his last drawn card may be discarded so that the player has the chance of reaching 21 on the next iteration. The iteration counter may increment with every card the player draws, or only with every card that the player must discard to stay under 21.

In another blackjack embodiment, the player keeps forcing the dealer to draw additional cards until the dealer busts (i.e., his card point total exceeds 21). The iteration counter may increment with every card the dealer draws.

In a typical keno game, a player chooses anywhere from 1 to 15 numbers, each between 1 and 80, inclusively. Twenty numbers are drawn, and the player is paid based on how many of his chosen number match the drawn numbers. In one embodiment of this invention, a player might choose 6 numbers and, as a target outcome, strive to match at least 4 of them. Twenty numbers might then be drawn. If the player has matched 4 or more numbers, then the player is paid. Otherwise, the twenty numbers are withdrawn and twenty new numbers are drawn. The player must now match at least 4 of his numbers with 4 of this new set of twenty numbers. The process of withdrawing the latest numbers and drawing a new set of twenty numbers continues until the player matches at least 4 numbers. Then the player is paid based on the number of times twenty new numbers had to be drawn.

In another embodiment, the player has chosen six numbers in keno and twenty numbers are drawn. If the player cannot match at least four of his numbers, then additional numbers are drawn without withdrawing the original twenty numbers. That is, if the player has matched three of his numbers with the original twenty numbers drawn, and a twenty-first number matches another of the player's chosen numbers, then the player has now matched four of his numbers and has therefore won. In this embodiment, once the original twenty numbers have been drawn, additional numbers may be drawn in groups of two or more. This way, if a player has matched three numbers already, the player has the chance to match five or more numbers rather than always matching exactly four, as would happen if additional numbers were drawn one at a time.

For example, suppose a player purchases a "Guaranteed to Win" keno ticket and chooses six numbers: 3, 9, 18, 22, 30, 41. The player wins by matching four or more numbers. Furthermore, on a given iteration, the player is better off matching five numbers, and even better off matching all six numbers. Once the player has purchased the ticket, 20 numbers are drawn. Among them are: 9, 22, and 41. Since the player has not yet matched four numbers, a 21$^{st}$ and a 22$^{nd}$ number are drawn. These, however, do not give the player any additional matches. So a 23$^{rd}$ and a 24$^{th}$ number are drawn. These numbers are: 3 and 18. Now the player has matched five numbers, and receives a generous payout.

According to some embodiments, a player might quit a game in exchange for the return of part of his wager or in exchange for a payment of a portion of an expected prize. For example, the player may begin with the primary outcome of "bar-bar-bell" at a three-reel slot game. The player might then place a wager of six coins and re-spin the third reel. After five re-spins of the third reel, the player finds that he still has not achieved the target outcome of "bar-bar-bar". The player may then decide to quit. Based on an examination of the payout table, the gaming device may find that, given that the player has not won after five re-spins, the player's expected winnings are just two coins. Accordingly, the gaming device pays two coins to the player, and the game ends.

In some additional embodiments, the player always has the option to quit for a fixed amount of money. In such embodiments, the payout table may be such that the player's expected winnings from continuing are always greater than or equal to the fixed amount of money the player would get for quitting. In other embodiments, the player is only better off quitting after a large number of unsuccessful iterations.

In one embodiment, a player repeatedly generates secondary outcomes. From time to time, the most recent secondary outcome will match a target outcome. When there is a match, the player has the opportunity to stop the game and receive the prize associated with the current secondary outcome. However, the player may also continue the game in the hopes of generating a secondary outcome to match an even higher paying target outcome. In some embodiments, if the player continues the game, then he may lose the opportunity to obtain the prize associated with the current secondary prize. In some alternative embodiments, after a set period of time in which the player has not himself ended the game, the game ends on its own. If the current secondary outcome is not one of the possible target outcomes, then the player wins nothing. This embodiment creates an exciting dilemma for the player. When he achieves a target outcome early on, does he stop the game and take his prize, or does he continue with the game in the hopes of obtaining an even larger prize?

As an example, a player is playing a three-reel slot game. The player's target outcomes are any of the standard winning outcomes (e.g., bar-bar-bar, lemon-lemon-lemon, any-any-cherry, etc.). The player places a wager of 40 coins. The player may then spin the reels up to 100 times. After each spin, the player has the opportunity to quit and to take the payout associated with the most recent spin. However, if the player elects to continue spinning, the player forfeits the opportunity to collect the payout. In this example, the player makes five losing spins before achieving lemon-lemon-lemon, an outcome with a payout of 35 coins. The player is tempted to take the 35 coins and quit. However, the player still has 94 spins remaining, each giving him the possibility of winning more than 35 coins. So the player elects to continue spinning. After another 50 or so spins with small or nonexistent payouts, the player achieves an outcome of "bell-bell-bell," with a payout of 20 coins. Once again, however, the player elects to continue spinning. On his 90$^{th}$ spin, the player again achieves "lemon-lemon-lemon." Now with only ten spins to go, the player figures that he is better off taking the 35-coin payout than risking winning less on the next ten spins. So the player accepts the 35 coins, and the game ends. The player has lost 5 coins on his original wager.

In the above embodiment, a casino might wish to determine beforehand a player's expected winnings. Knowing the player's expected winnings, a casino could require a wager that would assure the casino an expected profit. That is, the casino would require the player to make a wager slightly larger than the player's expected winnings. To begin with, imagine that a player is allowed to make N spins. The player may quit after any spin and take the most recent payout. However, if the player does not quit earlier, then the player must quit after N spins. Now imagine that, on any spin, the player may achieve any one of a set of outcomes, denoted x__1, x__2, . . . , x_k. Associated with each outcome is a probability of the outcome's occurrence on a given spin. The probability of outcome x_m occurring is denoted p(x_m). Each outcome x_m represents a payout. So, for example, x__2 may represent a six-token payout. The outcome x__2 does not necessarily correspond to one particular set of symbols, such as lemon-orange-cherry. Rather, x__2 may correspond to multiple symbol sets, so long as each pays six tokens.

If the player has made N−1 spins already and has decided to continue with his last spin, the player's expected winnings are exactly his expected winnings from making a single spin. Thus, the player's expected winnings are given by: $EV\_N=\Sigma_{m=1\ .\ .\ .\ k}x\_m*p(x\_m)$. Here, the symbol EV_N denotes the player's expected winnings going into the N$^{th}$ spin. Similarly, EV_(N−1) denotes the player's expected winnings going into the N−1$^{st}$ spin, EV__1 denotes the player's expected winnings going into the first spin, and so on.

A player who is not making his last spin will face a choice. If the outcome he achieves on the current spin is greater than his expected winnings for all the remaining spins, then the player will quit. Otherwise, he will continue. Therefore, if the player is on spin t, then $$EV\_\_t=\Sigma_{\{m|x\_\_m<EV\_\_(t+1)\}}EV\_(t+1)*p(x\_\_m)+\Sigma_{\{m|x\_\_m>=EV\_\_(t+1)\}}x\_\_m*p(x\_\_m)$$

Using this formula, a player's expected winnings when he is allowed up to N spins may be determined iteratively by determining his expected winnings given that he is on his last spin, then his expected winnings given that he is on his second to last spin, and so on down to his first spin. For example, one exemplary slot machine has the following payout structure:

| | | | | | | | | | | | | | | | | | | |
|---|---|---|---|---|---|---|---|---|---|---|---|---|---|---|---|---|---|---|
| Outcome | 0 | 2 | 2 | 5 | 5 | 5 | 20 | 10 | 10 | 20 | 14 | 14 | 20 | 18 | 18 | 20 | 50 | 100 |
| Hits | 8570 | 680 | 680 | 200 | 200 | 68 | 20 | 42 | 6 | 42 | 20 | 5 | 50 | 4 | 20 | 20 | 20 | 1 |

In the table, "Outcome" represents the number of tokens paid, and "Hits" represents the number of times the corresponding outcome would be expected to occur in 10,648 spins, or a complete cycle of the slot machine. The probability of each outcome occurring on a single spin can be found be dividing the "Hits" entry by 10,648. For example, the probability of the outcome that pays 100 tokens appearing on a single spin is $1/10{,}648=9.39*10^{-5}$, approximately.

If the player is allowed up to 10 spins on the above slot machine, and the player is on his tenth spin, then his expected winnings are given by:

$$\begin{aligned} EV\_10 &= 0*8570/10{,}648+2*680/10{,}648+2*680/10{,}648+ \\ &\quad 5*200/10{,}648+\ldots+100*1/10{,}648 \\ &= .945 \end{aligned}$$

If the player is on his ninth spin, then his expected winnings are given by:

$$\begin{aligned} EV\_9 &= EV\_10*8570/10{,}648+2*680/10{,}648+ \\ &\quad 2*680/10{,}648+\ldots+100*1/10{,}648 \\ &= 1.71 \end{aligned}$$

The procedure continues in the same fashion until EV_1 has been determined. Note that all units are in tokens. The table below shows a player's expected winnings given that he is on each of the ten possible spins. Again, units are in tokens.

| | | | | | | | | | | |
|---|---|---|---|---|---|---|---|---|---|---|
| Spin | 1 | 2 | 3 | 4 | 5 | 6 | 7 | 8 | 9 | 10 |
| EV | 5.38 | 5.02 | 4.65 | 4.24 | 3.81 | 3.35 | 2.85 | 2.32 | 1.71 | 0.945 |

From the above table, it can be seen that a player who is allowed up to ten spins at the slot machine with the aforementioned payout table, can expect to win 5.38 tokens. The player must, however, play a perfect strategy. The player should decide to quit only if the current outcome pays more tokens than the player can expect to win by continuing. So if the player achieves an outcome paying five tokens on the first spin, he should elect to continue, since he can expect to win 5.02 tokens in the remaining nine spins. However, if the player achieves an outcome paying five tokens on his fifth spin, he should quit and take the five tokens. This is because he can only expect to win 3.35 tokens on his remaining five spins.

A casino might use the above table to determine a wager that the player must make in order to receive ten spins with the option of quitting any time. Since the player would have expected winnings of 5.38 tokens, the casino might require a wager of 6 tokens so as to assure itself an expected profit.

In some embodiments involving mechanical reel slot machines, primary or secondary outcomes may be generated based simply on the physics of where the reels stop once set in motion. The slot machines need not use random number generators.

The disclosed invention may also apply to table games, such as roulette or blackjack. In a roulette embodiment, a player begins by placing chips on an area of the playing surface representing a particular outcome. The chips represent the player's wager. For example, the player makes a five-dollar wager on the number 33 by placing five one-dollar chips on an area marked "33". A casino representative then repeatedly spins the roulette wheel. For each spin, the casino representative places an iteration marker beside the player's wager. An iteration marker may be a specially shaped or colored token that represents the occurrence of one or more secondary outcomes. When, on a spin of the roulette wheel, the number 33 finally occurs, then the player has achieved his target outcome. The casino representative counts the number of iteration markers beside the player's wager. Then, the casino representative pays the player based on the player's wager and the number of secondary outcomes that have occurred since the player placed his wager. The payout is made in accordance with a predetermined payout table, which may be printed and laminated for easy reference by the player and the casino representative.

In a related embodiment, once a player places his wager, the casino representative places chips representing the maximum possible payout beside the player's wager. For each spin during which the player does not achieve his target outcome, the casino representative removes some of the chips he had placed beside the player's wager. Once the casino representative has removed all the chips he had placed, the casino representative begins removing chips that the player had placed as the wager. In this way, the chips remaining represent the maximum payout the player can expect for his original wager. When the player's target outcome does occur, the player receives the remaining chips on the area of the playing surface representing the target outcome.

In another embodiment, the casino representative does not track iterations with iteration markers or by removing chips from the playing surface. Instead, the casino representative keeps written, mechanical, or electronic record of the number of iterations. For example, every time a secondary outcome is generated, the casino representative presses a button which increments an electronic iteration counter attached to the playing surface. The iteration count may then be displayed with an LCD screen or other display device.

In a blackjack table game embodiment, a player might begin by placing a wager on a designated area of the playing surface. The player's target outcome might be to achieve a point total of 21, to beat the dealer, etc. The dealer may then track the number of iterations required for the player to achieve his target outcome. Once again, tracking may be accomplished with iteration markers, by placing and removing chips, or by otherwise recording the number of iterations. Various embodiments of the present invention may apply to other table games as well, including poker, war, pai gow, and so on.

According to some embodiments, information stored in a player database (e.g., player database 208) may be accessible to any gaming device at which a player plays, provided the player identifies himself by, for example, inserting a player tracking card. When a gaming device receives a player identifier, the gaming device may transmit the identifier to the casino server and receive player information from the server. Access to player information may allow a gaming device to simplify or to speed up steps of this invention. For example, if a player has a preferred primary or target outcome, then the gaming device need not ask a player to select a primary or a target outcome. A player may also be given special treatment based on his playing history. For example, a player with a high historical theoretical win may be allowed to begin with certain special primary outcomes, or may be allowed extra flexibility in choosing a payout table. However, the system of the present invention need not include a casino server. Instead, in some embodiments, the system may consist solely of a gaming device.

Although the present invention has been described with respect to a preferred embodiment thereof, those skilled in the art will note that various substitutions may be made to those embodiments described herein without departing from the spirit and scope of the present invention.

What is claimed is:

1. A method comprising:

determining, via a gaming device, a primary game outcome having a plurality of primary game elements;

determining, via the gaming device, a target game outcome having a plurality of target game elements, wherein:

at least one first target game element matches at least one first primary game element, and at least one second target game element does not match at least one second primary game element;

determining, via the gaming device, a payout table based on the primary game outcome and the target game outcome;

receiving a wager from a player of the gaming device;

generating, via the gaming device, at least one secondary game outcome, each secondary game outcome having a plurality of secondary game elements, the secondary game elements including at least one first secondary game element and a designated number of second secondary game elements, the designated number being at least one, and the at least one first secondary game element matching the at least one first primary game element and the at least one first target game element; and for each generated secondary game outcome:

(a) determining, via the gaming device, whether the designated number of second secondary game elements of said secondary game outcome matches the at least one second target game element, (b) if the designated number of second secondary game elements of said secondary game outcome matches the at least one second target game element, determining that said secondary game outcome is a matching secondary game outcome, and (c) if said secondary game outcome is the matching secondary game outcome, providing a payout based on the determined payout table and based on a quantity of secondary game outcomes generated prior to the generation of said matching secondary game outcome.

2. The method of claim 1, wherein generating the at least one secondary game outcome includes generating additional secondary game outcomes without requiring any additional wager from the player until the at least one second secondary game element of said generated secondary game outcome matches the at least one second target game element.

3. The method of claim 1, further comprising incrementing a count for each generated secondary game outcome, said count indicating the quantity of secondary game outcomes generated.

4. The method of claim 1, wherein receiving the wager from the player comprises receiving the wager from the player before determining the primary game outcome.

5. The method of claim 1, wherein receiving the wager from the player comprises receiving the wager from the player after determining the primary game outcome.

6. The method of claim 1, wherein generating a first secondary game outcome comprises generating said first secondary game outcome after receiving the wager from the player and before receiving any additional wager.

7. The method of claim 1, which includes determining the primary game outcome after receiving the wager from the player; and generating a first secondary game outcome after determining the primary game outcome and before receiving any additional wager.

8. The method of claim 1, which includes determining the primary game outcome before receiving the wager from the player, and generating a first secondary game outcome after receiving the wager from the player and before receiving any additional wager.

9. The method of claim 1, which includes generating a first secondary game outcome after receiving the wager from the player; and generating a second one of the at least one secondary game outcome before receiving any additional wager.

10. The method of claim 1, wherein determining the target game outcome comprises receiving an indication of a selection of a target game outcome by the player.

11. The method of claim 1, wherein the target game outcome is based on the primary game outcome.

12. The method of claim 1, wherein determining the target game outcome comprises determining at least one game element corresponding to the plurality of elements of the primary game outcome and determining the target game outcome based on the at least one determined game element.

13. The method of claim 1, wherein determining the target game outcome comprises determining a first rank associated with the primary game outcome and determining the target game outcome to be at least one game outcome associated with a second rank, the second rank being at least equal to the first rank.

14. The method of claim 1, wherein determining the target game outcome comprises:

determining a first rank associated with the primary game outcome;

determining a plurality of potential game outcomes, each potential game outcome associated with a different rank, each different rank being at least equal to the first rank; and selecting at least one of the plurality of potential game outcomes as the target game outcome.

15. The method of claim 1, wherein determining the target game outcome comprises designating the target game outcome.

16. The method of claim 1, wherein determining the target game outcome comprises determining at least one target game outcome associated with a payout amount which is not less than a predetermined minimum payout amount.

17. The method of claim 1, wherein determining the target game outcome comprises determining at least one target game outcome associated with a payout amount which is not greater than a predetermined maximum payout amount.

18. The method of claim 1, wherein determining the target game outcome comprises comparing the primary game outcome to a database of winning game outcomes.

19. The method of claim 1, further comprising determining the payout.

20. The method of claim 19, wherein determining the payout comprises determining the payout based on the target game outcome.

21. The method of claim 20, wherein determining the payout comprises determining the payout based on the primary game outcome.

22. The method of claim 19, wherein determining the payout comprises determining the payout based on a probability of achieving the target game outcome.

23. The method of claim 22, wherein determining the payout comprises determining the payout based on the primary game outcome.

24. The method of claim 22, wherein the probability of achieving the target game outcome is based on the primary game outcome.

25. A method comprising:

generating, via a gaming device, a first outcome of a game of chance, said first outcome including a first plurality of game elements;

determining, via the gaming device, a target outcome including a plurality of target elements, at least one of the plurality of target elements matching at least one of the first plurality of game elements;

receiving a first wager;

determining a payout based on the target outcome; and before receiving any second wager:

(a) generating, via the gaming device, a second outcome including a second plurality of game elements, wherein at least one of the second plurality of game elements matches at least one of the first plurality of game elements which matches at least one of the target elements, (b) repeating the step of generating the second outcome until, for said generated second outcome, the second plurality of elements matches the plurality of target elements, and (c) incrementally reducing the determined payout based on a quantity of second outcomes generated, wherein if a first quantity of second outcomes are generated, the determined payout is reduced a first amount and if a second, different quantity of second outcomes are generated, the determined payout is reduced a second, different amount.

26. A method of providing a card game, said method comprising:

receiving a first wager from a player;

after receiving said first wager, causing at least one display device to display a first hand of cards, the first hand of cards including a first card;

causing at least one input device to receive an indication of a request by the player for an offer of a guaranteed hand of cards;

causing at least one processor to execute a plurality of instructions to determine a guaranteed hand of cards to offer to the player, the guaranteed hand of cards including the first card, a second card, a third card, a fourth card, and a fifth card;

causing the at least one display device to display at least a portion of a payout table to the player, the payout table indicating a plurality of payout amounts, each payout amount associated with a total number of hands of cards displayed prior to achieving the guaranteed hand of cards;

causing the at least one input device to receive an indication of an acceptance by the player of the offer of the guaranteed hand;

after receiving the indication of the acceptance, causing the at least one display device to display a second hand of cards;

causing the at least one processor to execute the plurality of instructions to determine whether the second hand of cards includes each of the first card, the second card, the third card, the fourth card, and the fifth card;

if the second hand of cards includes each of the first card, the second card, the third card, the fourth card, and the fifth card, providing a payout to the player based on the payout amount associated with a first quantity of total hands of cards displayed prior to achieving the guaranteed hand of cards, as indicated in the payout table; and if the second hand of cards does not include each of the first card, the second card, the third card, the fourth card, and the fifth card, before receiving any second wager subsequent to the first wager:

causing the at least one display device to display a third hand of cards, causing the at least one processor to execute the plurality of instructions to determine whether the third hand of cards includes each of the first card, the second card, the third card, the fourth card, and the fifth card, and if the third hand of cards includes each of the first card, the second card, the third card, the fourth card, and the fifth card, providing the payout to the player based on the payout amount associated with a second quantity of total hands of cards displayed prior to achieving the guaranteed hand of cards, as indicated in the payout table.

27. A method of providing a reel game, said method comprising:

displaying a plurality of reels to a player, each reel including at least one of a plurality of reel symbols;

displaying a first outcome, the first outcome including at least a first one of the plurality of reel symbols on a first one of the plurality of reels;

causing at least one input device to receive an indication of a selection by the player of a guaranteed reel symbol from the plurality of reel symbols;

causing at least one display device to display at least a portion of a payout table to the player, the payout table indicating a plurality of payout amounts, each payout amount associated with a total quantity of re-spins of the second reel required to achieve the guaranteed reel symbol on the second reel;

receiving a first wager from the player;

causing the at least input device to receive an indication of a request by the player for a first re-spin of the second reel;

displaying a second outcome based on the first re-spin of the second reel;

causing at least one processor to execute a plurality of instructions to determine whether the second outcome includes the guaranteed reel symbol displayed on the second reel;

if the second outcome includes the guaranteed reel symbol displayed on the second reel, providing a first payout to the player based on the payout table and a first quantity of re-spins required to achieve the guaranteed reel symbol on the second reel; and if the second outcome does not include the guaranteed reel symbol displayed on the second reel:

before receiving any second wager subsequent to the first wager, displaying a third outcome based on a second re-spin of the second reel, and causing the at least one processor to execute the plurality of instructions to determine whether the third outcome includes the guaranteed reel symbol displayed on the second reel, if the third outcome includes the guaranteed reel symbol displayed on the second reel, providing a second payout to the player based on the payout table and a second quantity of re-spins required to achieve the guaranteed reel symbol on the second reel.

28. A method of providing a card game, said method comprising:

receiving a first wager from a player;

after receiving said first wager, causing at least one display device to display a first hand of cards, the first hand of cards including at least a first card;

causing at least one input device to receive an indication of a request by the player to hold the first card;

causing the at least one input device to receive an indication of a request by the player of an offer for a guaranteed hand of cards, the guaranteed hand including the first card, a second card, a third card, a fourth card, and a fifth card;

causing the at least one display device to display a second hand of cards, the second hand of cards including the first card and the second card;

causing the at least one input device to receive an indication of a request by the player to hold the second card;

causing the at least one display device to display a third hand of cards;

causing at least one processor to execute a plurality of instructions to determine whether the third hand of cards includes the first card, the second card, the third card, the fourth card, and the fifth card;

if the third hand of cards includes each of the first card, the second card, the third card, the fourth card, and the fifth card, providing a payout to the player based on a first quantity of hands of cards required to obtain the guaranteed hand of cards; and if the third hand of cards does not include each of the first card, the second card, the third card, the fourth card, and the fifth card:

before receiving any second wager from the player subsequent to the first wager, causing the at least one display device to display a fourth hand of cards, causing the at least one processor to execute the plurality of instructions to determine whether the fourth hand of cards includes the first card, the second card, the third card, the fourth card, and the fifth card, if the fourth hand of cards includes each of the first card, the second card, the third card, the fourth card, and the fifth card, providing a payout to the player based on a second quantity of hands of cards required to obtain the guaranteed hand of cards.

29. A method, comprising:

determining, via a gaming device, a primary game outcome comprising a primary set of game elements, the primary set of game elements comprising a first subset of game elements and a second subset of game elements;

determining, via the gaming device, a target game outcome comprising a target set of game elements, wherein the target set of game elements comprises the first subset of game elements and a third subset of game elements, the third subset of game elements being different from the second subset of game elements;

determining, via the gaming device, a payout table based on a probability of a random alteration of the second subset of game elements matching the third subset of game elements;

determining an indication of a wager provided by a player;

determining, by repeatedly randomly altering the second subset of game elements via the gaming device, a secondary game outcome comprising an alteration to the second subset of game elements;

determining, via the gaming device, that the altered second subset of game elements matches the target set of game elements; and providing, via the gaming device, a payout amount inversely related to a quantity of random alterations required before the randomly altered second subset of game elements matches the target set of game elements, said payout amount determined from the payout table.

30. The method of claim 29, wherein the primary game outcome has a first value, the target game outcome has a second value, the second value is higher than the first value, and determining the target game outcome comprises determining a selection, by a player, of a desired target game outcome.

31. A method of operating a gaming system, said method comprising:

providing, via a gaming device, an offer to a player of the gaming device for a guaranteed benefit in exchange for a payment, the guaranteed benefit of the offer including a predetermined target outcome, said predetermined target outcome including a plurality of symbols and requiring all of a plurality of reels of the gaming device to display said plurality of symbols;

receiving an indication of an acceptance of the offer by the player; and after receiving the indication of the acceptance of the offer, for each accepted offer:

causing at least one, but less than all of the plurality of reels to display at least one, but less than all of the plurality of symbols of the predetermined target outcome;

initiating, via the gaming device, at least one spin of less than all of the plurality of reels of the gaming device, said less than all of the plurality of reels of the gaming device including the plurality of reels not caused to display one of the symbols of the plurality of symbols of the predetermined target outcome;

generating, via the gaming device, the predetermined target outcome based on the at least one spin of less than all of the plurality of reels;

determining a non-zero payout of the guaranteed benefit, an amount of the payout of the guaranteed benefit based on a quantity of spins of less than all of the plurality of reels required to generate the predetermined target outcome; and providing the guaranteed benefit to the player of the gaming device.

* * * * *

UNITED STATES PATENT AND TRADEMARK OFFICE

CERTIFICATE OF CORRECTION

PATENT NO. : 8,012,013 B2
APPLICATION NO. : 10/205305
DATED : September 6, 2011
INVENTOR(S) : Jay S. Walker et al.

It is certified that error appears in the above-identified patent and that said Letters Patent is hereby corrected as shown below:

In Claim 2, column 34, lines 1 to 2, replace “the at least one second secondary game element” with --at least one of the designated number of second secondary game elements--.

In Claim 3, column 34, line 6, replace “the quantity” with --a quantity--.

In Claim 12, column 34, line 40, between “of” and “elements” add --primary game--.

In Claim 27, column 36, lines 50 to 51, replace “of the second reel” with --of a second one of the plurality of reels--.

In Claim 27, column 36, line 52, lines 55 to 56, line 58, line 62, and line 67, replace “second reel” with --second one of the plurality of reels--.

In Claim 27, column 37, lines 2, 5, 9, and 11, replace “second reel” with --second one of the plurality of reels--.

In Claim 27, column 37, line 5, delete “and”.

In Claim 27, column 37, line 9, at the end of the line add --and--.

In Claim 28, column 37, line 54, after “fifth card,” add --and--.

In Claim 30, column 38, line 28, replace “a player” with --the player--.

Signed and Sealed this
Twenty-sixth Day of June, 2012

David J. Kappos
*Director of the United States Patent and Trademark Office*

UNITED STATES PATENT AND TRADEMARK OFFICE

CERTIFICATE OF CORRECTION

PATENT NO. : 8,012,013 B2
APPLICATION NO. : 10/205305
DATED : September 6, 2011
INVENTOR(S) : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1521 days.

Signed and Sealed this
Fourth Day of September, 2012

David J. Kappos
*Director of the United States Patent and Trademark Office*